US011102656B2

(12) United States Patent
Yu et al.

(10) Patent No.: US 11,102,656 B2
(45) Date of Patent: Aug. 24, 2021

(54) NETWORK ACCESS AUTHORIZATION METHOD, RELATED DEVICE, AND SYSTEM

(71) Applicant: HUAWEI TECHNOLOGIES CO., LTD., Guangdong (CN)

(72) Inventors: Youyang Yu, Shanghai (CN); Huan Li, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,596

(22) Filed: Mar. 28, 2019

(65) Prior Publication Data

US 2019/0223012 A1 Jul. 18, 2019

Related U.S. Application Data

(63) Continuation of application No. PCT/CN2016/100553, filed on Sep. 28, 2016.

(51) Int. Cl.
*H04W 12/72* (2021.01)
*H04W 8/20* (2009.01)
(Continued)

(52) U.S. Cl.
CPC ........... *H04W 12/72* (2021.01); *H04L 63/102* (2013.01); *H04W 8/04* (2013.01); *H04W 8/20* (2013.01);
(Continued)

(58) Field of Classification Search
CPC . H04W 12/00514; H04W 12/08; H04W 8/20; H04W 8/04; H04W 12/00518;
(Continued)

(56) References Cited

U.S. PATENT DOCUMENTS

2006/0198347 A1 9/2006 Hurtta et al.
2007/0191014 A1 8/2007 Zheng et al.
(Continued)

FOREIGN PATENT DOCUMENTS

CN 101151920 A 3/2008
CN 102802201 A 11/2012
(Continued)

OTHER PUBLICATIONS

International Search Report dated Jun. 26, 2017 in corresponding International Application No. PCT/CN2016/100553.
(Continued)

*Primary Examiner* — Fred A Casca
(74) *Attorney, Agent, or Firm* — Slater Matsil, LLP

(57) ABSTRACT

Embodiments of the present invention disclose a network access authorization method, a related device, and a system. The method includes: when accessing a home network from an unlicensed spectrum access node, sending, by UE, a request message to the home network; performing, by a control plane network element of the home network based on access information and subscription data of the UE, access authorization for the UE that accesses the home network from the unlicensed spectrum access node, that is, determining whether to allow the UE to access the home network from the unlicensed spectrum access node; and sending an authorization result to the UE.

10 Claims, 10 Drawing Sheets

(51) Int. Cl.
*H04W 8/04* (2009.01)
*H04W 12/00* (2021.01)
*H04W 12/08* (2021.01)
*H04L 29/06* (2006.01)
*H04W 12/75* (2021.01)

(52) U.S. Cl.
CPC ......... *H04W 12/009* (2019.01); *H04W 12/08* (2013.01); *H04W 12/75* (2021.01); *H04L 63/0892* (2013.01)

(58) Field of Classification Search
CPC ... H04W 12/009; H04W 12/75; H04W 12/72; H04L 63/102; H04L 63/0892
See application file for complete search history.

(56) References Cited

U.S. PATENT DOCUMENTS

| | | | |
|---|---|---|---|
| 2014/0141743 A1* | 5/2014 | Shaw | H04W 72/048 455/405 |
| 2014/0341203 A1* | 11/2014 | Liu | H04L 65/1069 370/338 |
| 2015/0281966 A1 | 10/2015 | Griot et al. | |
| 2015/0373029 A1 | 12/2015 | Evenden et al. | |
| 2016/0014127 A1 | 1/2016 | Mohebbi | |
| 2016/0094515 A1 | 3/2016 | Chechani et al. | |
| 2017/0171782 A1* | 6/2017 | Mohamed | H04W 36/18 |

FOREIGN PATENT DOCUMENTS

| | | |
|---|---|---|
| CN | 104540185 A | 4/2015 |
| CN | 104852896 A | 8/2015 |
| CN | 104871578 A | 8/2015 |
| CN | 105164976 A | 12/2015 |
| CN | 105207756 A | 12/2015 |
| WO | 2012164363 A1 | 12/2012 |
| WO | 2015156641 A1 | 10/2015 |
| WO | 2016120436 A1 | 8/2016 |

OTHER PUBLICATIONS

Kostas Pentikousis et al., "Mobileflow: Toward Software-Defined Mobile Networks," IEEE Communications Magazine (vol. 51, Issue: 7, Jul. 2013), Jul. 12, 2013, pp. 44-53.
International Search Report, dated Jun. 26, 2017, in International Application No. PCT/CN2016/100553 (4 pp.).
Written Opinion of the International Searching Authority, dated Jun. 26, 2017, in International Application No. PCT/CN2016/100553 (7 pp.).

* cited by examiner

NETWORK ACCESS AUTHORIZATION METHOD, RELATED DEVICE, AND SYSTEM

CROSS-REFERENCE TO RELATED APPLICATIONS

This application is a continuation of International Application No. PCT/CN2016/100553, filed on Sep. 28, 2016, the disclosure of which is hereby incorporated by reference in its entirety.

TECHNICAL FIELD

Embodiments of the present invention relate to the field of communications technologies, and specifically, to a network access authorization method, a related device, and a system.

BACKGROUND

To meet challenges of wireless broadband technologies and maintain leads of 3rd Generation Partnership Project (3rd Generation Partnership Project, 3GPP) networks, the 3GPP discussion group formulated a Long Term Evolution (Long Term Evolution, LTE) plan for a mobile communications network in 2004, and defined a new mobile communications network architecture, that is, an evolved packet system (Evolved Packet System, EPS), under guidance of the plan. The EPS includes user equipment (User Equipment, UE), an access network, and an evolved packet core (Evolved Packet Core, EPC) network.

Currently, when UE accesses a home operator EPC from an access network, the home operator EPC needs to perform access authorization for the UE, and only the authorized UE can access the home operator EPC. In the EPS, spectrums used by an access network such as a universal terrestrial radio access network (Universal Terrestrial Radio Access Network, UTRAN) or an evolved universal terrestrial radio access network (Evolved UTRAN, E-UTRAN) are all licensed spectrums. With development of mobile broadband services, licensed spectrums gradually cannot meet fast growing service requirements, and using an unlicensed spectrum as a new radio access technology to improve an air interface bearer capability becomes a development trend of the access network of the EPS. Therefore, how to perform access authorization for UE that accesses a home operator EPC from an unlicensed spectrum access node has become a problem urgently to be resolved.

SUMMARY

Embodiments of the present invention disclose a network access authorization method, a related device, and a system to perform access authorization for UE that accesses a home operator EPC from an unlicensed spectrum access node.

A first aspect of the embodiments of the present invention discloses a network access authorization method, applied to an EPS, where the EPS includes an unlicensed spectrum access node, a local network device, and a control plane network element, and the method may include:

after receiving a first message sent by the local network device, the control plane network element may perform, based on the first message and subscription data of UE, access authorization for the UE that accesses a home network from the unlicensed spectrum access node, and send an authorization indication to the UE, where the first message includes a request message and access information of the UE, the request message is used to request that the UE should access the home network of the UE from the unlicensed spectrum access node, and the authorization indication includes an authorization result of the access authorization.

The request message may be an access request message or a service request message, and the unlicensed spectrum access node may be Wireless Fidelity (Wireless Fidelity, Wi-Fi), an unlicensed spectrum (Unlicensed LTE, LTE-U) access node in LTE, or even an unlicensed spectrum in 5G. This is not limited in the embodiments of the present invention. When the UE accesses the home network from a local network of the unlicensed spectrum access node, the control plane network element needs to perform access authorization for the UE based on the subscription data of the UE, and therefore can implement access authorization when the UE accesses the home network. After the access authorization is successful, the local network may share some services of the home network. Therefore, load of the home network can be reduced, and resource utilization can be improved.

Optionally, the subscription data may include second indication information about an access technology allowed to be used by the UE for accessing the home network, the access information may include first indication information, and the first indication information is used to indicate that an access technology used by the UE for accessing the home network is access from the unlicensed spectrum access node; and a specific manner in which the control plane network element performs, based on the request message, the access information, and the subscription data of the UE, access authorization for the UE that accesses the home network from the unlicensed spectrum access node may be:

determining, based on the request message, whether the second indication information includes the first indication information; and if the second indication information includes the first indication information, determining to allow the UE to access the home network from the unlicensed spectrum access node, that is, access authorization for the UE is successful; or if the second indication information does not include the first indication information, determining to reject access by the UE to the home network from the unlicensed spectrum access node, that is, access authorization for the UE fails.

Further, the subscription data may further include a first access mode of the unlicensed spectrum access node when the UE is allowed to access the home network from the unlicensed spectrum access node. If the access information further includes a second access mode of the unlicensed spectrum access node when the UE requests to access the home network from the unlicensed spectrum access node, if the second indication information includes the first indication information, the control plane network element further determines whether the first access mode matches the second access mode. The control plane network element can determine to allow the UE to access the home network from the unlicensed spectrum access node only if the first access mode matches the second access mode.

Alternatively, if the second indication information includes the first indication information, but the first access mode does not match the second access mode, the control plane network element determines to reject access by the UE to the home network from the unlicensed spectrum access node.

Further, the subscription data may further include a domain identifier list, and the domain identifier list includes at least one of a service provider identifier and a roaming union identifier of a local network in which the UE is allowed to access the home network from the unlicensed spectrum access node. If the access information further includes an identifier of a local network in which the UE requests to access the home network from the unlicensed spectrum access node, if the second indication information includes the first indication information, the control plane network element further determines whether the identifier of the local network exists in the domain identifier list. The control plane network element determines to allow the UE to access the home network from the unlicensed spectrum access node only if the identifier of the local network exists, where the identifier of the local network includes at least one of a service provider identifier and a roaming union identifier of the local network.

Alternatively, if the second indication information includes the first indication information, but the identifier of the local network does not exist in the domain identifier list, the control plane network element determines to reject access by the UE to the home network from the unlicensed spectrum access node.

Optionally, if the first access mode matches the second access mode, the control plane network element may further determine whether the identifier of the local network exists in the domain identifier list, and the control plane network element determines to allow the UE to access the home network from the unlicensed spectrum access node only if the identifier of the local network exists.

Alternatively, if the second indication information includes the first indication information, and the first access mode matches the second access mode, but the identifier of the local network does not exist in the domain identifier list, the control plane network element also determines to reject access by the UE to the home network from the unlicensed spectrum access node.

Further, the subscription data may be further extended to include at least one of information about a time at which the UE is allowed to access the home network from the unlicensed spectrum access node, information about a location (for example, 3GPP location information) at which the UE is allowed to access the home network from the unlicensed spectrum access node, a security level of the unlicensed spectrum access node, and a security authentication mode of the local network. In this case, the access information sent by the local network device to the control plane network element may also further include at least one of information about a time at which the UE requests to access the home network from the unlicensed spectrum access node, information about a location at which the UE requests to access the home network from the unlicensed spectrum access node, a security level of the unlicensed spectrum access node, and a security authentication mode of the local network.

It should be noted that, when performing access authorization for the UE, the control plane network element generally compares existing information included in the access information with corresponding information in the subscription data, but does not require that the access information should definitely include all information in the subscription data.

Subscription data related to authorization of access from an unlicensed spectrum to the home network is extended. When the UE is not allowed to perform access from the unlicensed spectrum access node, an indication such as "LTE-U not allowed" is set. Alternatively, authorization of access from an unlicensed spectrum access node is bound with an area or a time, that is, an area or a time period in which access from the unlicensed spectrum access node is allowed or forbidden is set.

The subscription data of the UE additionally includes a domain identifier list, such as a roaming union identifier list or a service provider list; and the UE is allowed to access the home network from a network deployed by a service provider or a roaming union member in the list. The subscription data may further limit an access mode and a security level (such as trusted or untrusted) of the network deployed by the service provider or the roaming union, that is, forbid the UE to access the home network from the network deployed by the service provider or the roaming union and having the matched access mode and security level.

The control plane network element performs, based on the access information and the subscription data of the UE, access authorization for the UE that accesses the home network from the unlicensed spectrum access node. Therefore, accuracy of access authorization performed for the UE can be improved.

Optionally, the EPS may further include a home network subscriber server (Home Subscriber Server, HSS); when the request message may be an access request message, that is, if the UE is initially attached to the home network by using the unlicensed spectrum access node, after the control plane network element receives the first message sent by the local network device, the control plane network element further sends, to the HSS, a second message for obtaining the subscription data of the UE; and if the HSS successfully performs access authorization for the UE based on the subscription data and the access information of the UE, the control plane network element receives the subscription data of the UE that is sent by the HSS, and therefore performs, based on the received subscription data, access authorization for the UE that accesses the home network from the unlicensed spectrum access node. If the HSS fails to perform access authorization for the UE based on the subscription data of the UE, the control plane network element receives an authorization result indicating access failure, and therefore forwards the authorization result to the UE through the local network device and the unlicensed spectrum access node.

When the UE is initially attached to the home network by using the unlicensed spectrum access node, the HSS performs initial access authorization for the UE based on the subscription data of the UE, and if authorization is successful, sends the subscription data of the UE to the control plane network element; and the control plane network element performs access authorization again for the UE based on the subscription data. Performing hierarchical access authorization for the UE can improve efficiency of performing access authorization for the UE.

Optionally, the request message is a service request message, that is, the UE is attached to the home network beforehand by using a licensed spectrum access node, and subsequently sends a service request to the home network by using the unlicensed spectrum access node, where the service request message carries a temporary identifier of the UE, for example, an identifier of the control plane network element to which the UE is attached, and the identifier may be specifically allocated by the home network to the UE. After receiving the first message sent by the local network device, the control plane network element determines, based on the temporary identifier of the UE, whether the control plane network element is a control plane network element to which the UE is attached. If yes, it indicates that the control plane network element has obtained the subscription data of the UE from the HSS beforehand. The control plane network element further determines whether the UE is in an idle state on a 3GPP side, and if the UE is in the idle state, the control plane network element performs, based on the request message, the access information, and the subscription data of the UE, access authorization for the UE that accesses the home network from the unlicensed spectrum access node. If the UE is in a connected state, the control plane network element rejects the service request of the UE.

If the UE is attached to the home network by using the licensed spectrum access node, the UE sends a service request to the home network by using the unlicensed spectrum access node. If the control plane network element to which the UE is attached determines that the UE is in the idle state, the control plane network element performs, based on the subscription data of the UE that is obtained from the HSS beforehand, access authorization for the UE, and therefore efficiency of performing access authorization for the UE can be improved.

Optionally, after the control plane network element performs, based on the subscription data of the UE, access authorization for the UE that accesses the home network from the unlicensed spectrum access node, if allowing the UE to access the home network from the unlicensed spectrum access node, the control plane network element may further obtain, from the subscription data of the UE, a type of a local service that the UE is allowed to use in a local network, then generate a local service policy of the UE based on the type of the local service, and send the local service policy to the local network device. Therefore, the local network device may perform local service authorization for the UE based on the local service policy when the UE initiates the local service, and this can improve efficiency of performing local service authorization for the UE that accesses an unlicensed spectrum network.

Specifically, the local service policy may be carried in the authorization indication and sent to the local network device, or may be separately sent to the local network device. This is not limited in the embodiments of the present invention.

A second aspect of the embodiments of the present invention discloses a control plane network element, where the control plane network element may include a receiving module, a processing module, and a sending module, and may be configured to perform the network access authorization method disclosed in the first aspect.

A third aspect of the embodiments of the present invention discloses another control plane network element, where the control plane network element may include a receiver, a processor, and a transmitter, the receiver corresponds to the receiving module of the control plane network element disclosed in the second aspect, the processor corresponds to the processing module of the control plane network element disclosed in the second aspect, the transmitter corresponds to the sending module of the control plane network element disclosed in the second aspect, and the control plane network element may be configured to perform the network access authorization method disclosed in the first aspect.

A fourth aspect of the embodiments of the present invention discloses another network access authorization method, applied to an EPS, where the EPS includes UE, an unlicensed spectrum access node, a local network device, and a control plane network element, and the method may include:

after receiving a request message of the UE that is sent by the unlicensed spectrum access node, the local network device sends a first message including the request message and access information to the control plane network element, and then may receive an authorization indication sent by the control plane network element and including an authorization result, and therefore send the authorization result to the UE.

The authorization indication is obtained by the control plane network element by performing, based on the request message, the access information, and subscription data of the UE, access authorization for the UE that accesses a home network from the unlicensed spectrum access node. The request message may be a service request message, or may be an access request message. This is not limited in the embodiments of the present invention. The request message is used to request that the UE should access the home network from the unlicensed spectrum access node. Specifically, the local network device sends the authorization result to the UE by using the unlicensed spectrum access node.

Optionally, the request message may include an identifier of the home network. After receiving the request message of the UE that is sent by the unlicensed spectrum access node, the local network device may generate routing information such as a network access identifier (Network Access Identifier, NAI) based on the identifier of the home network, and therefore send the first message to the control plane network element of the home network based on the routing information.

The NAI further includes domain identifier information of an intermediate node such as a virtual public land mobile network (Virtual Public Land Mobile Network, VPLMN), and a domain name such as a fully qualified domain name or fully qualified domain name (Fully Qualified Domain Name, FQDN), in addition to information about a home public land mobile network (Home Public Land Mobile Network, HPLMN) of a destination domain at which the request message finally arrives.

Optionally, if the authorization result of the access authorization is that the UE is allowed to access the home network from the unlicensed spectrum access node, the authorization indication may further include a local service policy of the UE (generated by the control plane network element based on the subscription data of the UE). In this case, after the local network device receives the local service policy of the UE that is sent by the control plane network element, if the local network device receives a second message that is sent by the unlicensed spectrum access node and used to request to establish a local service connection for the UE, the local network device may perform local service authorization for the UE based on the local service policy of the UE. If the authorization is successful, that is, allowing the UE to use a local service initiated in a local network, the local service connection is established for the UE; or if the authorization fails, that is, not allowing the UE to use a local service initiated in a local network, a request message is sent to the control plane network element, so that a public data network (Public Data Network, PDN) connection is established for the UE.

The second message may be specifically a PDN connection establishment request message, including a type of the requested local service or an access point name (Access Point name, APN) of the requested local service. Service authorization information additionally includes a type of an allowed local service, such as a data service, a voice service, or a local APN including a service provider identifier, and defined quality of service (Quality of Service, QoS), a charging policy, an access network security level, and a subscriber category of the service. Further, the service provider identifier or a roaming union identifier is defined for the local service authorization, that is, allowing implementation of the local service in a local network deployed by a specified service provider or roaming union.

If the access authorization performed for the UE that accesses the home network from the unlicensed spectrum access node is successful, if the UE initiates the local service, the local network device may perform local service authorization for the UE based on the local service policy of the UE, and this can improve efficiency of performing local service authorization for the UE that accesses the local network of an unlicensed spectrum.

Specifically, a specific manner in which the local network device performs local service authorization for the UE based on the local service policy of the UE may be as follows:

Manner 1: If the second message includes a type of a local service requested by the UE, after receiving the second message, the local network device determines whether a service type in the local service policy includes the type of the local service requested by the UE, and if the service type in the local service policy includes the type of the local service requested by the UE, determines that local service authorization for the UE is successful, or if the service type in the local service policy does not include the type of the local service requested by the UE, determines that local service authorization for the UE fails.

Manner 2: If the second message includes an APN identifier of a local service requested by the UE, after receiving the second message, the local network device determines whether a service APN identifier in the local service policy includes the APN identifier of the local service, and if the service APN identifier in the local service policy includes the APN identifier of the local service, determines that local service authorization for the UE is successful, or if the service APN identifier in the local service policy does not include the APN identifier of the local service, determines that local service authorization for the UE fails.

After local service authorization is successful, the local service of the UE may be performed in the local network. Therefore, some services of the home network can be shared, load of the home network can be reduced, and resource utilization can be improved.

A fifth aspect of the embodiments of the present invention discloses a local network device, where the local network device may include a receiving module, a sending module, and a processing module, and may be configured to perform the network access authorization method disclosed in the fourth aspect.

A sixth aspect of the embodiments of the present invention discloses another local network device, where the local network device may include a receiver, a transmitter, a processor, and the like, the receiver corresponds to the receiving module of the local network device disclosed in the fifth aspect, the transmitter corresponds to the sending module of the local network device disclosed in the fifth aspect, the processor corresponds to the processing module of the local network device disclosed in the fifth aspect, and the local network device may be configured to perform the network access authorization method disclosed in the fourth aspect.

A seventh aspect of the embodiments of the present invention discloses still another network access authorization method, applied to an EPS, where the EPS includes UE, an unlicensed spectrum access node, a local network device, a control plane network element, and an HSS, and the method may include:

after receiving a first message that is sent by the control plane network element and used to obtain subscription data of the UE, the HSS first obtains the subscription data of the UE, and performs, based on the first message and the subscription data, access authorization for the UE that accesses a home network from the unlicensed spectrum access node; and if allowing the UE to access the home network from the unlicensed spectrum access node, the HSS sends the subscription data of the UE to the control plane network element, so that the control plane network element performs, based on the subscription data, access authorization again for the UE that accesses the home network from the unlicensed spectrum access node.

The first message includes an access request message and access information of the UE, and the access request message is used to request that the UE should access the home network from the unlicensed spectrum access node.

Further, if the HSS does not allow the UE to access the home network from the unlicensed spectrum access node, the HSS sends an authorization indication such as "LTE-U not allowed" to the control plane network element, so that the control plane network element forwards the authorization indication to the UE.

Optionally, the subscription data may include second indication information about an access technology allowed to be used by the UE for accessing the home network, the access information may include first indication information, and the first indication information is used to indicate that an access technology used by the UE for accessing the home network is access from the unlicensed spectrum access node. In this case, a specific manner in which the HSS performs, based on the access request message, the access information, and the subscription data of the UE, access authorization for the UE that accesses the home network from the unlicensed spectrum access node may be:

determining, based on the access request message, whether the second indication information includes the first indication information; and if the second indication information includes the first indication information, determining to allow the UE to access the home network from the unlicensed spectrum access node; or if the second indication information does not include the first indication information, determining to reject access by the UE to the home network from the unlicensed spectrum access node.

Optionally, the subscription data may include a domain identifier list, and the domain identifier list includes at least one of a service provider identifier of a local network in which the UE is allowed to access the home network from the unlicensed spectrum access node, and a roaming union identifier; the access information further includes an identifier of a local network in which the UE requests to access the home network from the unlicensed spectrum access node, and the identifier of the local network includes at least one of a service provider identifier and a roaming union identifier of the local network. In this case, a specific manner in which the HSS performs, based on the access request message, the access information, and the subscription data of the UE, access authorization for the UE that accesses the home network from the unlicensed spectrum access node may be:

determining, based on the access request message, whether the identifier of the local network exists in the domain identifier list; and if the identifier of the local network exists, determining to allow the UE to access the home network from the unlicensed spectrum access node; or if the identifier of the local network does not exist, determining to reject access by the UE to the home network from the unlicensed spectrum access node.

If the UE is initially attached to the home network by using the unlicensed spectrum access node, after the HSS receives the first message used to obtain the subscription data of the UE, the HSS may perform initial access authorization for the UE based on the access request message and the access information in the first message, and the subscription data of the UE. The subscription data of the UE is sent to the control plane network element only if authorization is successful, so that the control plane network element performs access authorization again for the UE based on the subscription data. The HSS and the control plane network element perform hierarchical access authorization for the UE that accesses the home network from the unlicensed spectrum access node. Therefore, accuracy of access authorization performed for the UE can be improved.

An eighth aspect of the embodiments of the present invention discloses an HSS, where the HSS may include a receiving module, a processing module, and a sending module, and may be configured to perform the network access authorization method disclosed in the seventh aspect.

A ninth aspect of the embodiments of the present invention discloses another HSS, where the HSS may include a receiver, a processor, and a transmitter, the receiver corresponds to the receiving module of the HSS disclosed in the eighth aspect, the processor corresponds to the processing module of the HSS disclosed in the eighth aspect, the transmitter corresponds to the sending module of the HSS disclosed in the eighth aspect, and the HSS may be configured to perform the network access authorization method disclosed in the seventh aspect.

A tenth aspect of the embodiments of the present invention discloses a network access authorization system, where the system is applied to an EPS, and the system includes an unlicensed spectrum access node, the control plane network element disclosed in the second aspect, and the local network device disclosed in the fifth aspect, where after receiving a request message of UE requesting to access a home network, the unlicensed spectrum access node may forward the request message to the local network device; the local network device sends the request message and access information of the UE for accessing the home network to the control plane network element; and therefore, the control plane network element may perform, based on the request message, the access information, and subscription data of the UE, access authorization for the UE that accesses the home network from the unlicensed spectrum access node, and send an authorization result to the UE.

Optionally, the subscription data of the UE is extended to include second indication information about an access technology allowed to be used by the UE for accessing the home network, the access information sent by the local network device to the control plane network element includes first indication information, and the first indication information is used to indicate that an access technology used by the UE for requesting to access the home network is access from the unlicensed spectrum access node. Therefore, after receiving the request message and the access information of the UE, the control plane network element determines whether the second indication information includes the first indication information; and if the second indication information includes the first indication information, it indicates that the UE is allowed to access the home network from the unlicensed spectrum access node.

Optionally, the network access authorization system may further include the HSS disclosed in the eighth aspect. The request message may be an access request message or may be a service request message. If the request message is the access request message, after receiving the access request message and the access information of the UE that are sent by the local network device, the control plane network element obtains the subscription data of the UE from the HSS, and sends the access technology used by the UE for accessing the home network to the HSS; the HSS performs, based on the access technology used by the UE, authorization for the UE that accesses the home network from the unlicensed spectrum access node; and if authorization is successful, the HSS returns the subscription data of the UE to the control plane network element, so that the control plane network element performs access authorization again for the UE that accesses the home network from the unlicensed spectrum access node.

In the embodiments of the present invention, the control plane network element and the HSS of the home network may perform access authorization for the UE that accesses the home network from the unlicensed spectrum access node. If access authorization is successful, the control plane network element of the home network may generate a local service policy of the UE, and send the local service policy to the local network device; and the local network device may perform local service authorization for the UE based on a local service initiated by the UE, thereby implementing local service authorization for the UE that accesses a local network of an unlicensed spectrum. After the local service authorization is successful, the local service of the UE may be performed in the local network. Therefore, some services of the home network can be shared, load of the home network can be reduced, and resource utilization can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a network access authorization method, a related device, and a system to perform access authorization for UE that accesses a home network EPC from an unlicensed spectrum access node. Details are separately described in the following.

Figure 1:
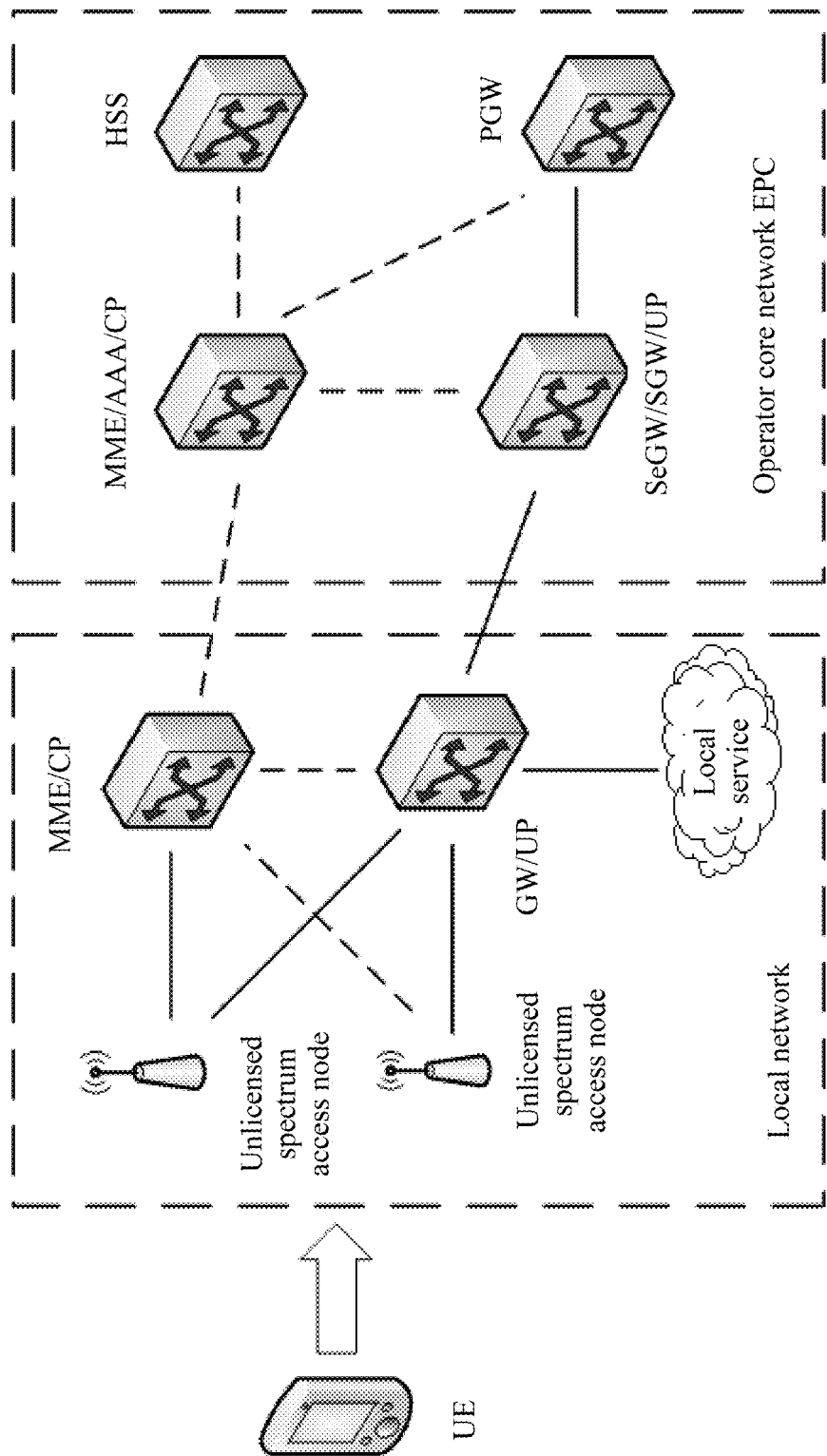
FIG. 1 is a schematic architectural diagram of an EPS according to an embodiment of the present invention.

For better understanding the network access authorization method, the related device, and the system disclosed in the embodiments of the present invention, the following first describes an EPS architecture to which the embodiments of the present invention are applicable. FIG. 1 is a schematic architectural diagram of an EPS according to an embodiment of the present invention. The system architecture shown in FIG. 1 includes UE, a local network, and an operator core network EPC. The UE may include various handheld devices, in-vehicle devices, wearable devices, and computing devices having a wireless communications function, or other processing devices connected to a wireless modem, and various forms of user equipments, mobile stations (Mobile station, MS), terminals (terminal), terminal devices (Terminal Equipment), and the like. For ease of description, in the embodiments of the present invention, the devices mentioned above are collectively referred to as user equipment or UE.

The system architecture shown in FIG. 1 is applied to a roaming scenario. In FIG. 1, the local network is a network deployed by a third party, and is different from the operator network. The local network includes an unlicensed spectrum access node (such as an LTE-U radio access node, LTE-U access node for short), a Wi-Fi access node, an unlicensed spectrum access node in 5G), a local network control plane network element, and a local network user plane network element. The unlicensed spectrum access node is a base station, an access point (Access Point, AP), or the like using an unlicensed spectrum. The local network control plane network element is a mobility management entity (Mobility Management Entity, MME) or a control plane node (Control Plane, CP). The local network user plane network element is a gateway (Gate Way, GW) or a user plane node (User Plane, UP). The operator EPC includes a control plane network element, a user plane network element, an HSS, and a public data network gateway (Public Data Network Gate Way, PGW). The control plane network element is an MME, an authentication, authorization and accounting (Authentication, Authorization and Accounting, AAA) server, an evolved packet gateway (Evolved Packet Data Gateway, ePDG), a serving general packet radio service (General Packet Radio Service, GPRS) support node (Serving GPRS Support Node, SGSN), or a CP. The user plane network element is a security gateway (Security Gate Way, SeGW), a serving gateway (Serving Gate Way, SGW), or a UP. This is not limited in the embodiments of the present invention.

It should be noted that, the local network device mentioned in the embodiments of the present invention is the local network control plane network element, and the control plane network element mentioned in the embodiments of the present invention is the control plane network element in the operator EPC. This is not described again in the embodiments of the present invention.

In the system architecture shown in FIG. 1, when the UE accesses the home operator EPC from the unlicensed spectrum access node of the local network, the home operator EPC needs to perform access authorization for the UE, that is, determine whether to allow the UE to access a home network to which the UE belongs from the unlicensed spectrum access node; and if the home operator EPC allows the UE to perform access from the unlicensed spectrum access node of the local network, the UE may initiate a local service to the local network. The system architecture shown in FIG. 1 uses an unlicensed spectrum as a new radio access technology, and therefore an air interface bearer capability of the system can be improved.

Figure 2:
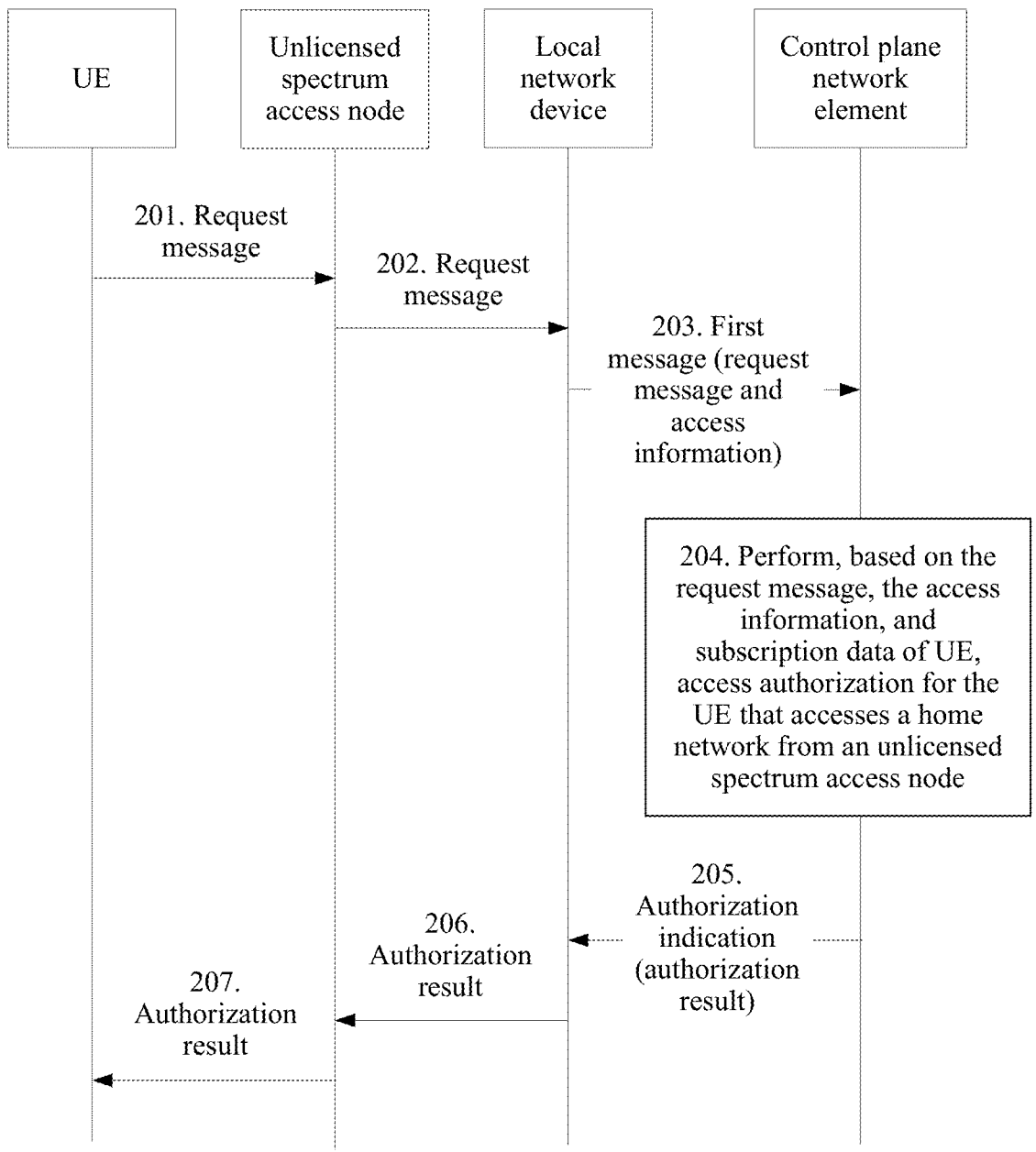
FIG. 2 is a schematic flowchart of a network access authorization method according to an embodiment of the present invention.

Based on the system architecture shown in FIG. 1, an embodiment of the present invention discloses a network access authorization method. FIG. 2 is a schematic flowchart of a network access authorization method according to an embodiment of the present invention. As shown in FIG. 2, the network access authorization method may include the following steps:

201. UE sends a request message to an unlicensed spectrum access node.

In this embodiment of the present invention, the request message may be an access request message, or may be a service request message. This is not limited in this embodiment of the present invention. When the request message is the access request message, the access request message may be specifically an attach request Attach Request message, an authentication and authorization request Authentication and Authorization Request (including a NAI) message, a connection request message, a non-access stratum (Non-Access Stratum, NAS) message (such as an attach request message) carrying a Diameter message (such as an authentication and authorization request (NAI) message), or the like. When the request message is the service request message, the service request message may be specifically a service request, a re-authorization request Re-Authorization Request message, a connection request message, or the like. This is not limited in this embodiment of the present invention.

In this embodiment of the present invention, after discovering and selecting the unlicensed spectrum access node, the UE may send the request message to the unlicensed spectrum access node, where the request message is used to request that the UE should access a home network. The UE may further use an identifier of a home operator network, also referred to as an identifier of a home public land mobile network (Home public land mobile network, HPLMN), as a selected network, and send the identifier in an air interface message to the unlicensed spectrum access node. Specifically, the identifier may be sent out in an independent message, or may be sent out in the request message. This is not limited in this embodiment of the present invention.

Optionally, the request message may further include at least one of current location information of the UE and access point information, for example, geographic location information (longitude and latitude) of the UE, 3GPP location information, cellular network broadcast location information of a home network operator (such as an identifier of an LTE base station), an identifier of an accessed unlicensed spectrum cell, an identifier of an accessed unlicensed spectrum base station, or an access point identifier defined by a local network (such as "an access point of a coffee shop" or "an access point of an airport"). This is not limited in this embodiment of the present invention.

202. The unlicensed spectrum access node receives the request message and forwards the request message to a local network device.

In this embodiment of the present invention, after receiving the request message sent by the UE, the unlicensed spectrum access node forwards, based on the identifier of the home network, the request message to a control plane network element of the local network, such as an MME. The unlicensed spectrum access node may further send location information of the unlicensed spectrum access node or the access point information when forwarding the request message of the UE.

Optionally, the cellular network broadcast location information of the home network operator such as the identifier of the LTE base station is an identifier of a neighboring base station in a cellular network configured on the unlicensed spectrum access node. When a plurality of identifiers of neighboring cellular base stations of the operator are configured on the unlicensed spectrum access node, the unlicensed spectrum access node sends the identifier of the home network to the local network device based on the selected network. Specifically, the request message may carry the identifier of the home network.

In addition, the unlicensed spectrum access node may further send an access mode of the access point, such as an open mode, a closed mode, or a hybrid mode, to the local network device. The open mode identifies that the access point allows access of any UE. The closed mode identifies that the access point allows access of only UE that has a subscription relationship. The hybrid mode is a combination of the two modes, that is, not only access of UE having a subscription relationship is allowed, but also access of UE not having a subscription may be allowed based on a local policy. The local policy includes allowing, based on a load status of the access point, a time period, or the like, access of UE not having a subscription relationship.

203. The local network device receives the request message and sends a first message including the request message and access information to a control plane network element.

In this embodiment of the present invention, after receiving the request message, the local network device determines, based on the identifier of the home network, the HPLMN marked by the identifier. Specifically, if the request message received by the local network device is the attach request message, and the message carries the Diameter message (that is, the NAS message carries the Diameter message), the local network device sends the Diameter message to the control plane network element in the HPLMN. In other words, the first message may be the Diameter message. This is not limited in this embodiment of the present invention.

In addition, when sending the first message, the local network device may further send, to the control plane network element of the home network, access information of the UE for accessing the home network from the unlicensed spectrum access node, so that the control plane network element performs access authorization for the UE based on the access information and subscription data of the UE. The access information includes at least one of feature information of the local network, feature information of the unlicensed spectrum access node (which may be obtained by the local network device, or may be sent by the unlicensed spectrum access node to the local network device together with the forwarded request message), location information of the UE (including 3GPP information of the UE, or the like), and time information.

The local network device may send both the access information and the request message to the control plane network element, that is, the first message includes both the request message and the access information. The local network device may also separately send the access information to the control plane network element. This is not limited in this embodiment of the present invention.

204. The control plane network element receives the first message, and performs, based on the request message, the access information, and subscription data of the UE, access authorization for the UE that accesses a home network from the unlicensed spectrum access node.

In this embodiment of the present invention, after receiving the first message, the control plane network element may determine, based on the request message of the UE, the access information, and the subscription data of the UE, whether to allow the UE to access the home network from the unlicensed spectrum access node.

205. The control plane network element sends an authorization indication including an authorization result to the local network device.

206. The local network device sends the authorization result to the unlicensed spectrum access node.

207. The unlicensed spectrum access node sends the authorization result to the UE.

In this embodiment of the present invention, after the control plane network element performs access authorization for the UE that accesses the home network from the unlicensed spectrum access node, the control plane network element may send the authorization indication including the authorization result to the UE. Specifically, the control plane network element sends the authorization indication to the local network device, the local network device sends the authorization result to the unlicensed spectrum access node, and the unlicensed spectrum access node sends the authorization result to the UE.

Specifically, when allowing the UE to access the home network from the unlicensed spectrum access node, the control plane network element sends an authorization indication used to indicate that the UE is allowed to access the home network from the unlicensed spectrum access node (the authorization indication may be an authorization result indicating that the UE is allowed to access the home network from the unlicensed spectrum access node, or may be a local service policy of the UE, indicating that the UE is allowed to access the home network from the unlicensed spectrum access node); or when not allowing the UE to access the home network from the unlicensed spectrum access node, the control plane network element sends an authorization indication used to indicate that access by the UE to the home network from the unlicensed spectrum access node is rejected (the authorization indication is an authorization result indicating that access by the UE to the home network from the unlicensed spectrum access node is rejected).

Obviously, in the method described in FIG. 2, when the UE needs to access the home network from the unlicensed spectrum access node, the UE sends the request message to the home network; and the control plane network element of the home network performs, based on the subscription data of the UE, access authorization for the UE that accesses the home network from the unlicensed spectrum access node, that is, determines whether to allow the UE to access the home network from the unlicensed spectrum access node, and therefore sends the authorization result to the UE. In this embodiment of the present invention, an EPS may perform access authorization for UE that accesses a home operator core network from an unlicensed spectrum access node; and after access authorization is successful, a local network may share some services of a home network. Therefore, load of the home network can be reduced, and resource utilization can be improved.

Figure 3A:
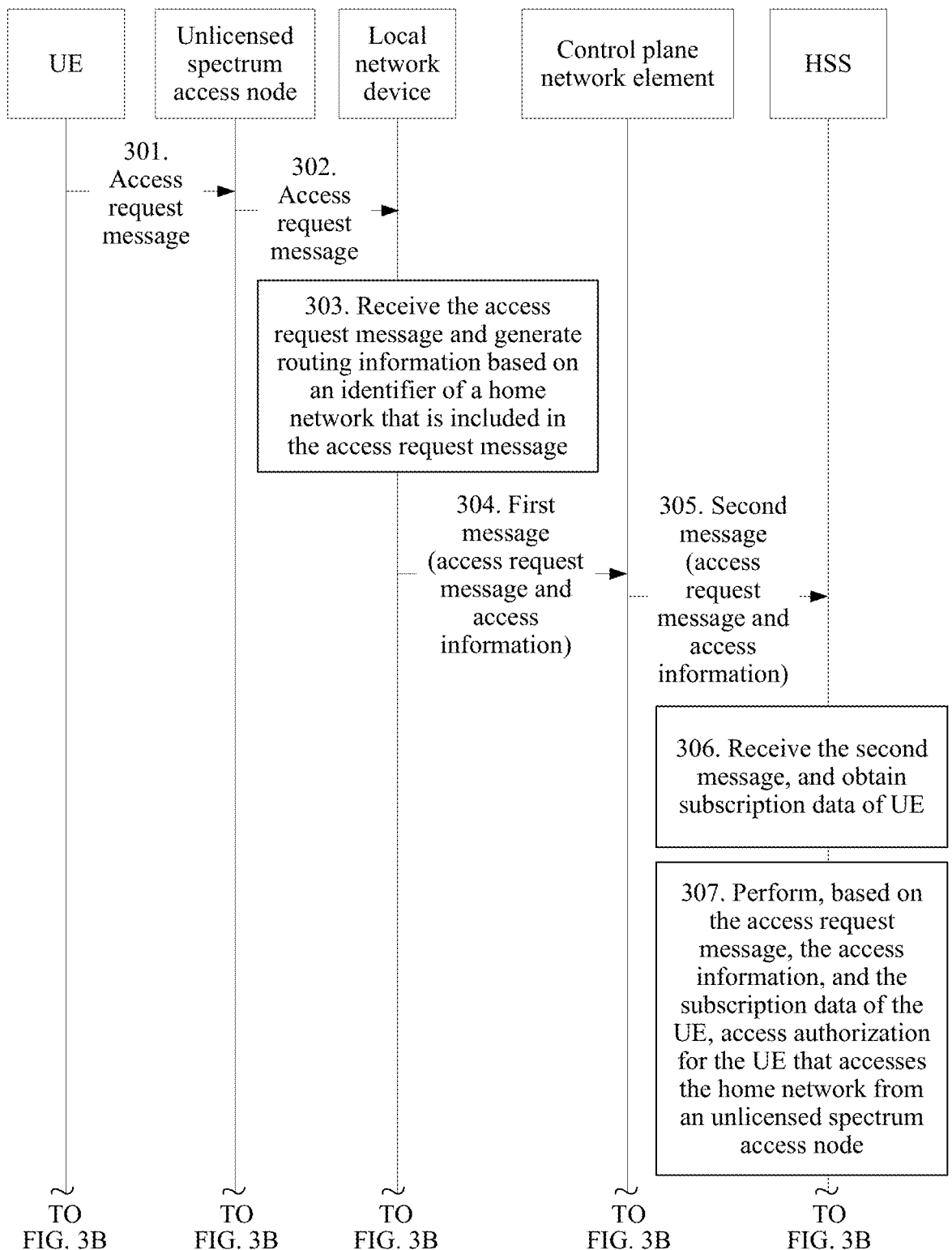
FIG. 3A and FIG. 3B are a schematic flowchart of another network access authorization method according to an embodiment of the present invention.
Figure 3B:
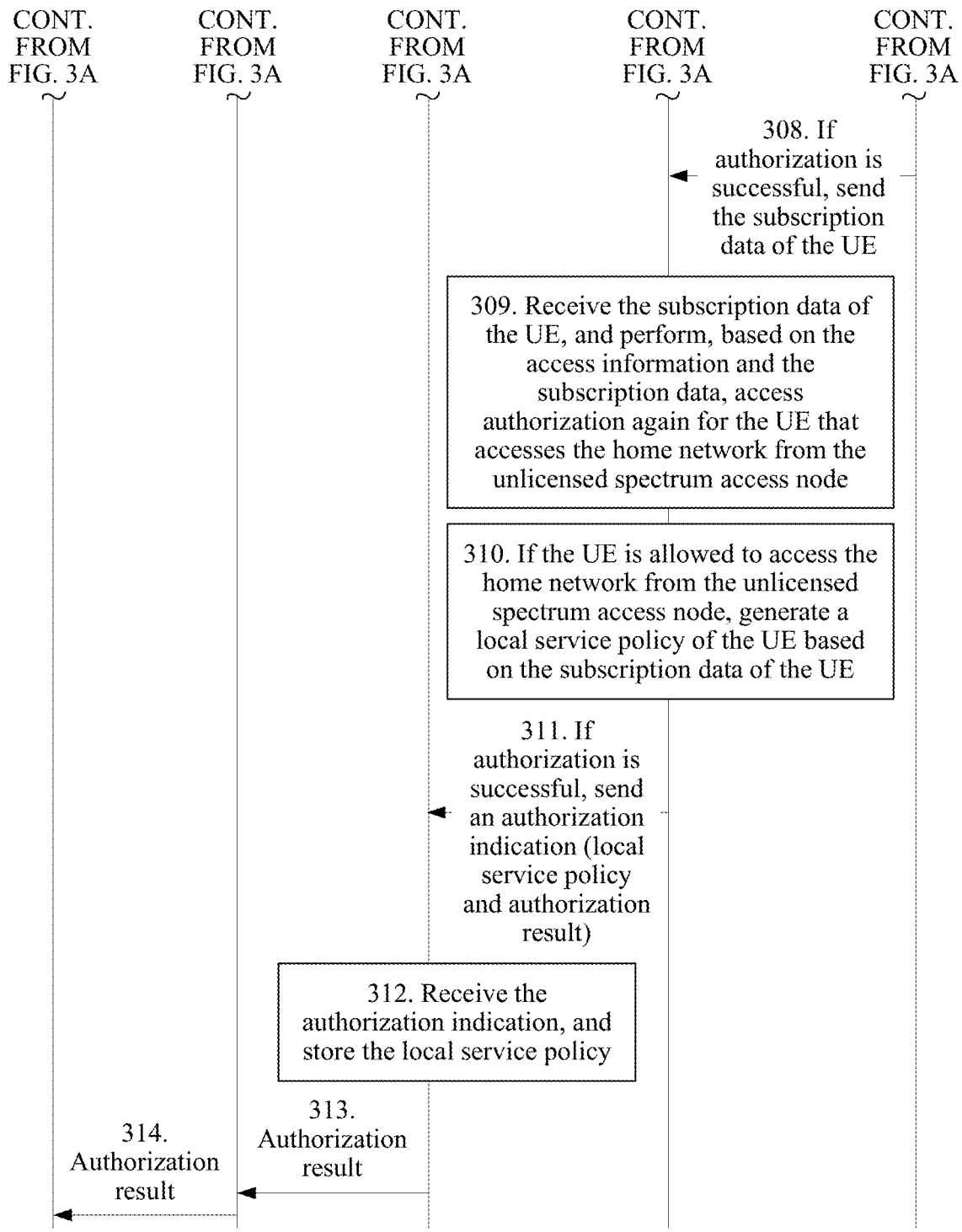

Based on the system architecture shown in FIG. 1, an embodiment of the present invention discloses another network access authorization method. FIG. 3A and FIG. 3B are a schematic flowchart of another network access authorization method according to an embodiment of the present invention. The method shown in FIG. 3A and FIG. 3B is applied to a scenario in which UE, when initially attached, sends an access request message to a home operator EPC by using an unlicensed spectrum access node. As shown in FIG. 3A and FIG. 3B, the network access authorization method may include the following steps:

301. UE sends an access request message to an unlicensed spectrum access node.

In this embodiment of the present invention, the access request message may be an attach request message, an authentication and authorization request (NAI) message, a connection request message, or a NAS message, where the NAS message carries a Diameter message such as an authentication and authorization request (NAI) message.

In this embodiment of the present invention, when the UE is just powered on, the UE searches for a nearby access network; and when discovering an unlicensed spectrum network, the UE sends, to the unlicensed spectrum access node, a request message for requesting to access a home network of the UE. The request message may include an identifier of the home network, location information of the UE, current time information, or the like.

302. The unlicensed spectrum access node receives the access request message and forwards the access request message to a local network device.

In this embodiment of the present invention, after receiving the access request message sent by the UE, the unlicensed spectrum access node forwards the access request message to the local network device based on the identifier of the home network.

In addition, the unlicensed spectrum access node sends at least one of an access mode and a security level of the unlicensed spectrum access node to the local network device. The at least one of the access mode and the security level may be added to the request message and sent to the local network device, or may be sent to the local network device by using another message. This is not limited in this embodiment of the present invention.

303. The local network device receives the access request message and generates routing information based on an identifier of a home network that is included in the access request message.

In this embodiment of the present invention, after receiving the request message, the local network device generates the routing information based on the identifier of the home network and a network topology, for example, generates a NAI. The NAI further includes domain identifier information of an intermediate node such as a VPLMN, and a domain name such as an FQDN, in addition to information about an HPLMA of a destination domain at which the request message finally arrives. The NAI may be understood as access information of the UE for accessing the home network from the unlicensed spectrum access node.

Optionally, the local network device may write, to the NAI, first indication information used to indicate an access technology used by the UE for accessing the home network, where the access technology is access from the unlicensed spectrum access node; and the local network device may further write, to the NAI, security authentication information used by a local network. For example, assuming that a security authentication mode used by the local network is Extensible Authentication Protocol Authentication and Key Agreement (Extensible Authentication Protocol Authentication and Key Agreement, EAP-AKA) or EAP-AKA', the local network device writes, to the NAI, an identifier representing EAP-AKA or EAP-AKA'.

Optionally, the local network device may further allocate a temporary identifier to the UE, where the temporary identifier may also be written to the NAI.

304. The local network device sends, based on the routing information, a first message including the access request message and access information to a control plane network element.

In this embodiment of the present invention, after generating the routing information, the local network device may send the first message to the control plane network element of the home network based on a domain identifier of the intermediate node and an identifier of the HPLMN of the destination domain in the routing information. The first message is used to request that the UE should access the home network from an unlicensed spectrum access node.

It should be noted that, the first message may be a Diameter message, such as an authentication and authorization request message, or a message defined by another protocol. This is not limited in this embodiment of the present invention.

In this embodiment of the present invention, the first message includes the access request message of the UE and the access information of the UE for accessing the home network from the unlicensed spectrum access node, for example, the first indication information, and the access mode of the unlicensed spectrum access node that is sent by the unlicensed spectrum access node, a service provider identifier (Service Provider Identifier/Identity, SP ID) and/or a roaming union identifier (Union ID) of the local network, the security level of the unlicensed spectrum access node, or the like. This is not limited in this embodiment of the present invention.

Optionally, the local network device may further send security authentication information supported by the local network to the control plane network element of the home network by using a related parameter (Security info).

It should be noted that, the access information included in the first message mainly includes the first indication information, that is, the access technology used by the UE for accessing the home network. Optionally, the access information may further include the access mode of the unlicensed spectrum access node and the identifier of the local network. Further, the access information may further include the location information of the UE, the time information, the security level of the unlicensed spectrum access node, and the security authentication mode of the local network. The identifier of the local network includes at least one of the SP ID and the union ID of the local network.

It should be noted that, the service provider identifier is an identifier of a service provider deploying the local network, or an identifier of an enterprise deploying the local network, or an identifier of an infrastructure provider, or even an identifier of a government department, or the like. A roaming union is a union formed by a plurality of organizations such as a service provider, a mobile operator, a fixed network operator, a Wi-Fi operator, an enterprise, an infrastructure provider, and a government department. Each union has a unique union identifier, and members in the union share the union identifier.

305. The control plane network element receives the first message, and sends a second message to an HSS based on the first message.

In this embodiment of the present invention, after receiving the first message sent by the local network device, the control plane network element sends the second message to the HSS based on the access request message in the first message. The second message is used to obtain subscription data of the UE.

In this embodiment of the present invention, the second message may be specifically an update location request (update location request) message, and the update location request message includes a permanent identifier of the UE, for example, an International Mobile Subscriber Identity (International Mobile Subscriber Identity, IMSI).

In addition, after receiving the access information sent by the local network device, the control plane network element may store the access information, and may further send at least one of the SP ID, the union ID, and the first indication information in the access information to the HSS, where the first indication information indicates that a type of a radio access technology (Radio Access Technology, RAT) used by the UE is an unlicensed spectrum (such as LTE-U).

Specifically, the second message may carry at least one of the type of the RAT, the union ID, and the SP ID in the access information. The control plane network element may also send the at least one of the type of the RAT, the union ID, and the SP ID in the access information to the HSS separately. This is not limited in this embodiment of the present invention.

306. The HSS receives the second message, and obtains subscription data of the UE.

In this embodiment of the present invention, after receiving the second message, the HSS updates a control plane network element (such as an MME) providing a service for the UE, and searches for the subscription data of the UE based on the IMSI of the UE.

307. The HSS performs, based on the access request message, the access information, and the subscription data of the UE, access authorization for the UE that accesses the home network from the unlicensed spectrum access node.

In this embodiment of the present invention, after finding the subscription data of the UE, the HSS performs access authorization for the UE that accesses the home network from the unlicensed spectrum access node.

In this embodiment of the present invention, a specific manner in which the HSS performs, based on the access request message, the access information, and the subscription data of the UE, access authorization for the UE that accesses the home network from the unlicensed spectrum access node may be:

the HSS determines whether the access information matches the subscription data, and if the access information matches the subscription data, allows the UE to access the home network from the unlicensed spectrum access node, or if the access information does not match the subscription data, rejects access by the UE to the home network from the unlicensed spectrum access node.

Specifically, the HSS detects, mainly based on the received access information and the subscription data of the UE, whether the UE can perform access from the unlicensed spectrum access node, and may further detect whether the UE can perform access from the network deployed by the service provider marked by the SP ID or the roaming union marked by the union ID.

For detecting whether the UE can perform access from the unlicensed spectrum access node, the subscription data is extended to include the type of the RAT allowed to be used when the UE accesses the home network, that is, second indication information. If the second indication information does not include unlicensed spectrum access (the first indication information), or the subscription data indicates that unlicensed spectrum access is not allowed, the HSS returns, to the control plane network element, an authorization indication including a cause value, where the cause value is that the type of the RAT does not allow access, or the HSS returns, to the control plane network element, an authorization result indicating that access by the UE to the home network from the unlicensed spectrum access node is rejected. Therefore, the control plane network element sends the authorization result to the UE by using the local network device and the unlicensed spectrum access node. Specifically, the control plane network element may send an access failure message to the UE, or send an access response message including the failure cause value to the UE. This is not limited in this embodiment of the present invention.

For detecting whether the UE can access the SP ID or the union ID, the subscription data is extended to include a domain identifier list (such as an SP list and/or a union list) allowing the UE to roam (that is, allowing the UE to access the home network from the local network). If the domain identifier list (such as the SP list and/or the union list) does not include the SP ID or the union ID, the HSS returns, to the control plane network element, an authorization indication including a cause value, where the cause value is "roaming not allowed", for example, a "VPLMN not allowed" indication, a "service provider not allowed" indication, or a "roaming not allowed" indication. Therefore, the control plane network element sends an access failure message to the UE, or sends an access reply message including the failure cause value to the UE. This is not limited in this embodiment of the present invention.

308. If the UE is allowed to access the home network from the unlicensed spectrum access node, the HSS sends the subscription data of the UE to the control plane network element.

In this embodiment of the present invention, if the HSS detects that the UE can access the home network from the unlicensed spectrum access node deployed by the current SP or union, the HSS returns the subscription data of the UE to the control plane network element. Further, the HSS may further return, to the control plane network element, an authorization result indicating that the UE is allowed to access the home network from the unlicensed spectrum access node.

Specifically, the subscription data of the UE that is returned by the HSS may include subscription data related to unlicensed spectrum access authorization, subscription data related to access authorization of the SP ID or the union ID, subscription data related to local service authorization in the local network, subscription data related to EPC service authorization, or the like.

It should be noted that, the subscription data related to unlicensed spectrum access authorization may include: the unlicensed spectrum, as an allowed access technology, is further bound with at least one of a UE location and time. For example, unlicensed spectrum access in a location area (a geographic location or a 3GPP cellular location such as a tracking area identity (Tracking Area Identity, TAI) or a TAI list) is allowed, or unlicensed spectrum access in a location area is not allowed, or unlicensed spectrum access in a time period is allowed, or unlicensed spectrum access in a time period is not allowed, or an effective combination of the location and the time is used.

The subscription data related to access authorization of the SP ID or the union ID may include: the local network deployed by the SP, as a network allowing access, is further bound with at least one of an access mode, an "access network trusted or untrusted" indication, or a UE location area. For example, the UE is only allowed to access an access network that is deployed by the SP and whose access mode is closed mode, or the UE is only allowed to access a trusted access network deployed by the SP, or the UE is only allowed to access networks that are in some locations and are deployed by the SP, or any combination of the foregoing cases is used.

The subscription data related to local service authorization in the local network may include: a type identifier of an allowed local service, or an APN of a local service (the APN of the local service includes a service identifier and/or a service provider identifier), for example, a data service, a voice service, an Internet service, or any service, or a type of a forbidden local service, for example, a forbidden data service, a forbidden voice service, or a forbidden Internet service. Further, for the allowed service type, required quality of service parameters (for example, a bandwidth that needs to be guaranteed for a service (a guaranteed bit rate (Guaranteed Bit Rate, GBR), or a maximum bit rate (Maximum Bit Rate, MBR)), a service scheduling policy priority or the like (a quality of service class identifier (QoS Class Identifier, QCI), or the Address Resolution Protocol (Address Resolution Protocol, ARP)), a charging policy (for example, postpaid or prepaid, or time-based charging, or traffic-based charging), and a subscriber category (for example, an identifier of a gold subscriber, a silver subscriber, or a bronze subscriber) are defined. In addition, the allowed service type may be bound with an "access network trusted or untrusted" feature or the SP ID or the union ID. For example, some local services can be performed only on a trusted unlicensed spectrum access node deployed by a specified SP ID or union ID.

The subscription data related to EPC service authorization may include APN subscription information, that is, APN configuration data.

309. The control plane network element receives the subscription data of the UE that is sent by the HSS, and performs, based on the access information and the subscription data, access authorization again for the UE that accesses the home network from the unlicensed spectrum access node.

In this embodiment of the present invention, after receiving the subscription data of the UE that is sent by the HSS, the control plane network element performs, based on the access information and the subscription data, access authorization again for the UE that accesses the home network from the unlicensed spectrum access node.

In this embodiment of the present invention, a specific manner in which the control plane network element performs, based on the access information and the subscription data, access authorization again for the UE that accesses the home network from the unlicensed spectrum access node may be:

redetermining whether the second indication information includes the first indication information, that is, whether the access technology allowed to be used by the UE for accessing the home network includes the access technology used by the UE for accessing the home network; and if the second indication information includes the first indication information, determining to allow the UE to access the home network from the unlicensed spectrum access node; or if the second indication information does not include the first indication information, determining to reject access by the UE to the home network from the unlicensed spectrum access node.

Further, if the control plane network element determines that the second indication information includes the first indication information, the control plane network element may further determine whether a first access mode of the unlicensed spectrum access node matches a second access mode of the unlicensed spectrum access node in the access information when the subscription data allows the UE to access the home network from the unlicensed spectrum. This may be understood as determining whether the first access mode is consistent with the second access mode, or whether the first access mode includes the second access mode. The control plane network element can determine to allow the UE to access the home network from the unlicensed spectrum access node only if the first access mode matches the second access mode. Alternatively, even if the second indication information includes the first indication information, but the first access mode does not match the second access mode, the control plane network element also determines to reject access by the UE to the home network from the unlicensed spectrum access node.

Further, if determining that the second indication information includes the first indication information, the control plane network element may further determine whether the domain identifier list in the subscription data includes the identifier (the SP ID and/or the union ID) of the local network in the access information. The control plane network element can determine to allow the UE to access the home network from the unlicensed spectrum access node only if the domain identifier list includes the identifier of the local network. Alternatively, even if the second indication information includes the first indication information, but the domain identifier list does not include the identifier of the local network, the control plane network element also determines to reject access by the UE to the home network from the unlicensed spectrum access node.

Further, after determining that the second indication information includes the first indication information, the control plane network element may further determine whether the domain identifier list includes the identifier of the local network in the access information, and whether the first access mode matches the second access mode.

For example, assuming that a network supporting EAP-AKA' is a trusted network, and a network supporting EAP-AKA is an untrusted network, or local networks deployed by some service providers are trusted networks and other networks are untrusted networks, the subscription data specifies that the UE may perform access from the trusted networks. In this case, the control plane network element determines, based on the security authentication mode of the local network or a related parameter carried in the NAI, or based on a combination of the security authentication mode of the local network and the SP ID, whether to allow the UE to perform access from the local network.

For another example, assuming that the subscription data only allows the UE to perform access from an unlicensed spectrum access node that is deployed by a service provider A and whose access mode is the closed mode, after obtaining the subscription data of the UE, the control plane network element may determine whether the access mode of the unlicensed spectrum access node is the closed mode, and whether the unlicensed spectrum access node is deployed by the service provider A; and if both are yes, determine that the UE can access the home network from the unlicensed spectrum access node.

Further, the control plane network element may further determine, based on the location information or time information of the UE that accesses the home network from the unlicensed spectrum access node, whether to allow the UE to access the home network from the unlicensed spectrum access node.

If the control plane network element determines, based on the access information and the subscription data of the UE, not to allow the UE to access the home network from the unlicensed spectrum access node, the control plane network element sends an access failure message to the UE, or sends an access reply message including a failure cause value to the UE.

310. If the UE is allowed to access the home network from the unlicensed spectrum access node, the control plane network element generates a local service policy of the UE based on the subscription data of the UE.

In this embodiment of the present invention, if determining, based on the access information and the subscription data of the UE, to allow the UE to access the home network from the unlicensed spectrum access node, the control plane network element may further obtain a type of a local service allowed to be used by the UE in the local network, and therefore generate the local service policy of the UE based on the type of the local service.

In other words, if access authorization is successfully performed for the UE, the control plane network element determines which local services of the UE may be used in the local network. Therefore, the local service policy of the UE is generated based on information about the allowed local service. The local service policy may include the type identifier of the local service, the APN of the local service, a QoS parameter, the charging policy, the subscriber category, or the like.

311. If authorization is successful, the control plane network element sends an authorization indication including the local service policy of the UE and an authorization result to the local network device.

In this embodiment of the present invention, after performing access authorization for the UE that accesses the home network from the unlicensed spectrum access node, the control plane network element sends the authorization indication to the local network device. If allowing the UE to access the home network from the unlicensed spectrum access node, the control plane network element sends the local service policy or an authorization result indicating authorization success to the local network device, and therefore the local network device sends the authorization result to the UE by using the unlicensed spectrum access node; or if not allowing the UE to access the home network from the unlicensed spectrum access node, the control plane network element sends an authorization result indicating access failure to the UE, or sends an access reply message including a failure cause value to the UE.

312. The local network device receives the authorization indication, and stores the local service policy of the UE.

In this embodiment of the present invention, after receiving the authorization indication, the local network device may store the local service policy of the UE that is included in the authorization indication, so that local service authorization is performed for the UE based on the stored local service policy when the UE subsequently initiates a local service request.

Steps 313 to 314 are the same as steps 206 and 207 in the foregoing embodiment. Details are not described again herein in this embodiment of the present invention.

Obviously, in the method described in FIG. 3A and FIG. 3B, when the UE is initially attached, the UE sends the access request message to the home operator core network by using the unlicensed spectrum access node, and the control plane network element and the HSS of the home operator perform access authorization for the UE based on the subscription data of the UE, the access technology used by the UE, the access mode of the unlicensed spectrum access node, the identifier of the local network, the time information, the location information, or the like, thereby implementing access authorization for the UE that accesses the home network from the unlicensed spectrum access node. After access authorization is successful, the local network may share some services of the home network. Therefore, load of the home network can be reduced, and resource utilization can be improved.

Figure 4A:
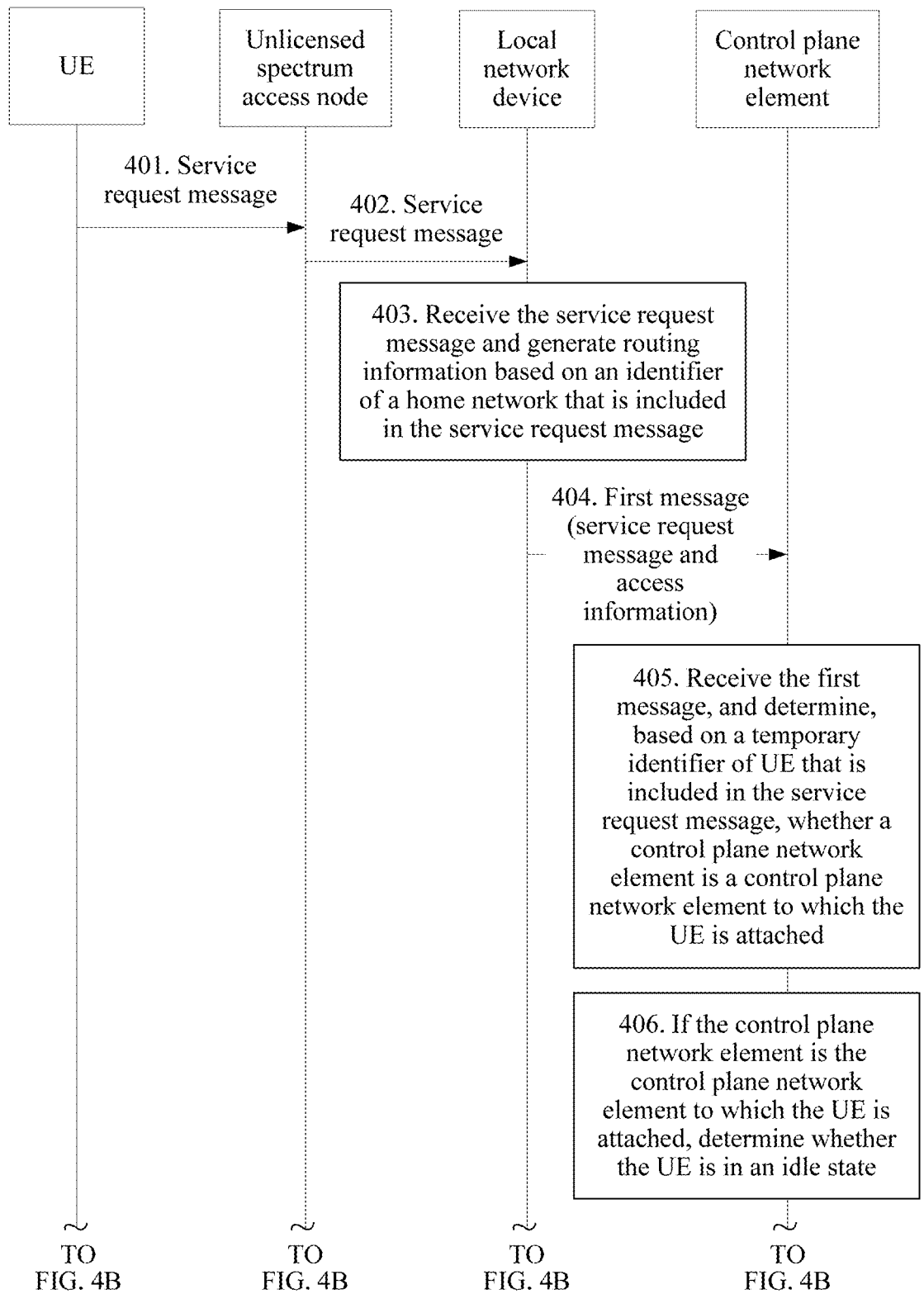
FIG. 4A and FIG. 4B are a schematic flowchart of still another network access authorization method according to an embodiment of the present invention.
Figure 4B:
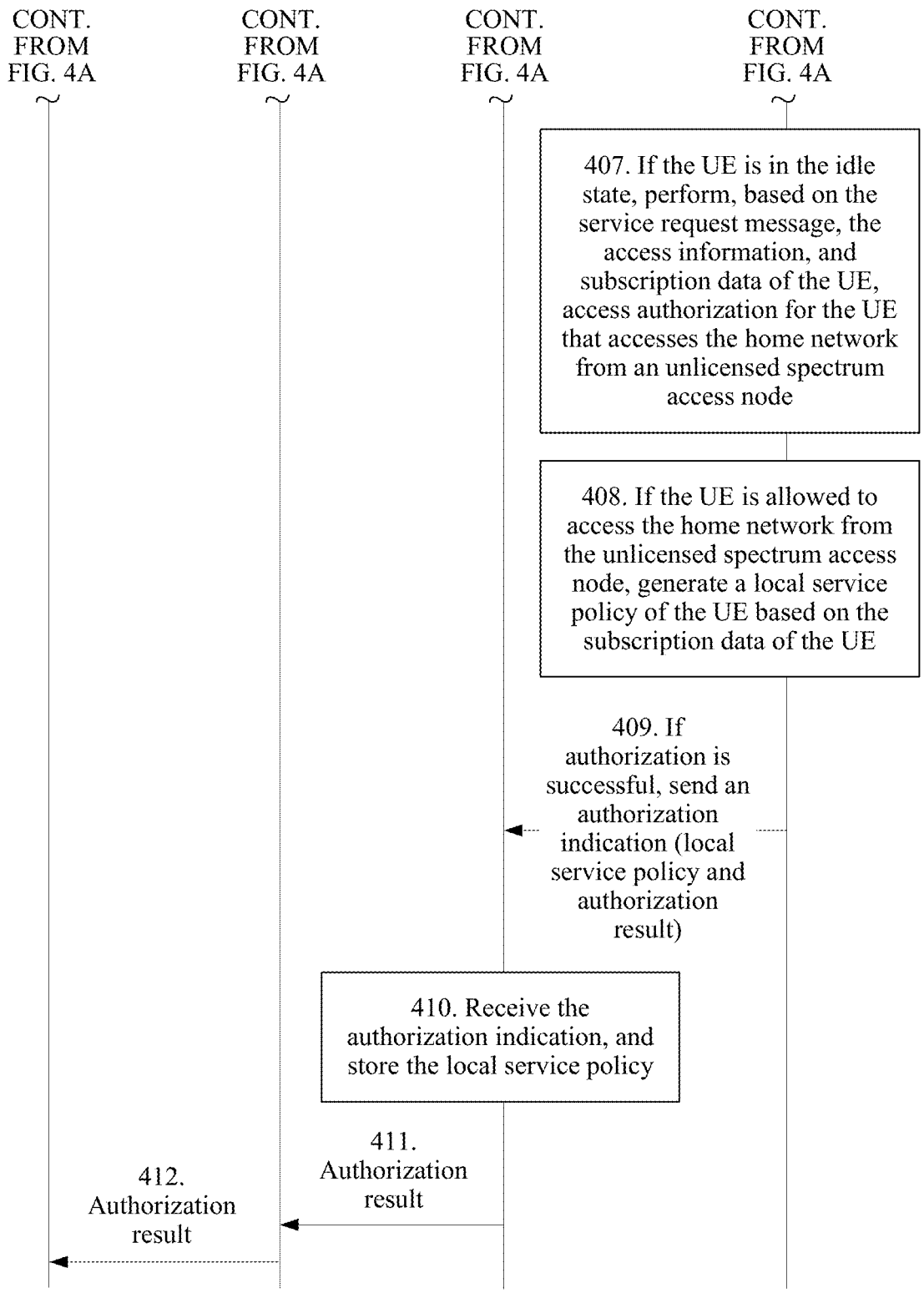

Based on the system architecture shown in FIG. 1, an embodiment of the present invention discloses still another network access authorization method. FIG. 4A and FIG. 4B are a schematic flowchart of another network access authorization method according to an embodiment of the present invention. The method shown in FIG. 4A and FIG. 4B is applied to a scenario in which UE is initially attached to an operator EPC by using a licensed spectrum access node and subsequently sends a service request message to a home operator EPC by using an unlicensed spectrum access node. As shown in FIG. 4A and FIG. 4B, the network access authorization method may include the following steps:

401. UE sends a service request message to an unlicensed spectrum access node.

In this embodiment of the present invention, the service request message may be a service request, a re-authorization request, a connection request message, or the like. The service request message may include a temporary identifier allocated by a home operator network to the UE, and the temporary identifier includes an identifier of a control plane network element such as an MME to which the UE is attached.

In this embodiment of the present invention, after the UE is attached to the home network from a licensed spectrum access node, when the UE discovers an unlicensed spectrum network, the UE sends the service request message to the unlicensed spectrum access node. The service request message may include an identifier of the home network, location information of the UE, current time information, or the like.

402. The unlicensed spectrum access node receives the service request message and forwards the service request message to a local network device.

403. The local network device receives the service request message and generates routing information based on an identifier of a home network that is included in the service request message.

404. The local network device sends, based on the routing information, a first message including the service request message and access information to a control plane network element.

In this embodiment of the present invention, steps 402 to 404 are the same as steps 302 to 304 in the foregoing embodiment. Details are not described again herein in this embodiment of the present invention.

405. The control plane network element receives the first message, and determines, based on a temporary identifier of the UE that is included in the service request message, whether the control plane network element is a control plane network element to which the UE is attached.

In this embodiment of the present invention, the temporary identifier of the UE is allocated by the home network to the UE. After receiving the first message sent by the local network device, the control plane network element determines, based on the temporary identifier included in the service request message, whether the control plane network element is the control plane network element to which the UE is attached. Specifically, the control plane network element determines whether a context of the UE exists, for example, searches for the context of the UE based on the temporary identifier of the UE, or determines, based on identifier information of the control plane network element in the temporary identifier of the UE, whether the control plane network element is the control plane network element to which the UE is attached. If the current control plane network element is not the control plane network element to which the UE is attached, the control plane network element forwards the first message (including the service request message and the access information) to the control plane network element to which the UE is attached; therefore the control plane network element to which the UE is attached performs, based on the service request message, the access information, and subscription data of the UE, access authorization for the UE that accesses the home network from the unlicensed spectrum access node.

406. If the control plane network element is the control plane network element to which the UE is attached, the control plane network element determines whether the UE is in an idle state.

In this embodiment of the present invention, if the control plane network element determines that the control plane network element is the control plane network element to which the UE is attached, the control plane network element first determines, based on a connected state of the UE on a 3GPP side, whether the UE can perform access from the unlicensed spectrum access node. Specifically, if the UE is currently in the connected state on the 3GPP side, the control plane network element rejects the service request of the UE; or if the UE is currently in the idle state on the 3GPP side, the control plane network element performs, based on the service request message, the access information, and the subscription data of the UE, access authorization for the UE that accesses the home network from the unlicensed spectrum access node. Details are the same as those in the foregoing embodiment and not described again herein in this embodiment of the present invention.

In a specific implementation, a specific manner in which the control plane network element determines whether the UE is in the idle state may be: the control plane network element determines a status of the UE according to whether an S1 interface connection exists. If the S1 interface connection exists, the UE is in the connected state; otherwise, the UE is in the idle state.

407. If the UE is in the idle state, the control plane network element performs, based on the service request message, the access information, and subscription data of the UE, access authorization for the UE that accesses the home network from the unlicensed spectrum access node.

In this embodiment of the present invention, if the UE is in the idle state, the control plane network element performs, based on the service request message, the access information, and the subscription data of the UE, access authorization for the UE that accesses the home network from the unlicensed spectrum access node. A specific manner is the same as that in step 309.

Steps 408 to 412 are the same as steps 310 to 314 in the foregoing embodiment. Details are not described again herein in this embodiment of the present invention.

Obviously, in the method described in FIG. 4A and FIG. 4B, the UE is initially attached to the operator EPC by using the licensed spectrum access node and subsequently sends the service request message to the home operator core network by using the unlicensed spectrum access node; and the control plane network element of the home operator performs access authorization for the UE based on the subscription data of the UE, an access technology used by the UE, an access mode of the unlicensed spectrum access node, an identifier of a local network, the time information, the location information, or the like, and therefore can implement access authorization for the UE that accesses the unlicensed spectrum network. After access authorization is successful, the local network may share some services of the home network. Therefore, load of the home network can be reduced, and resource utilization can be improved.

Figure 5:
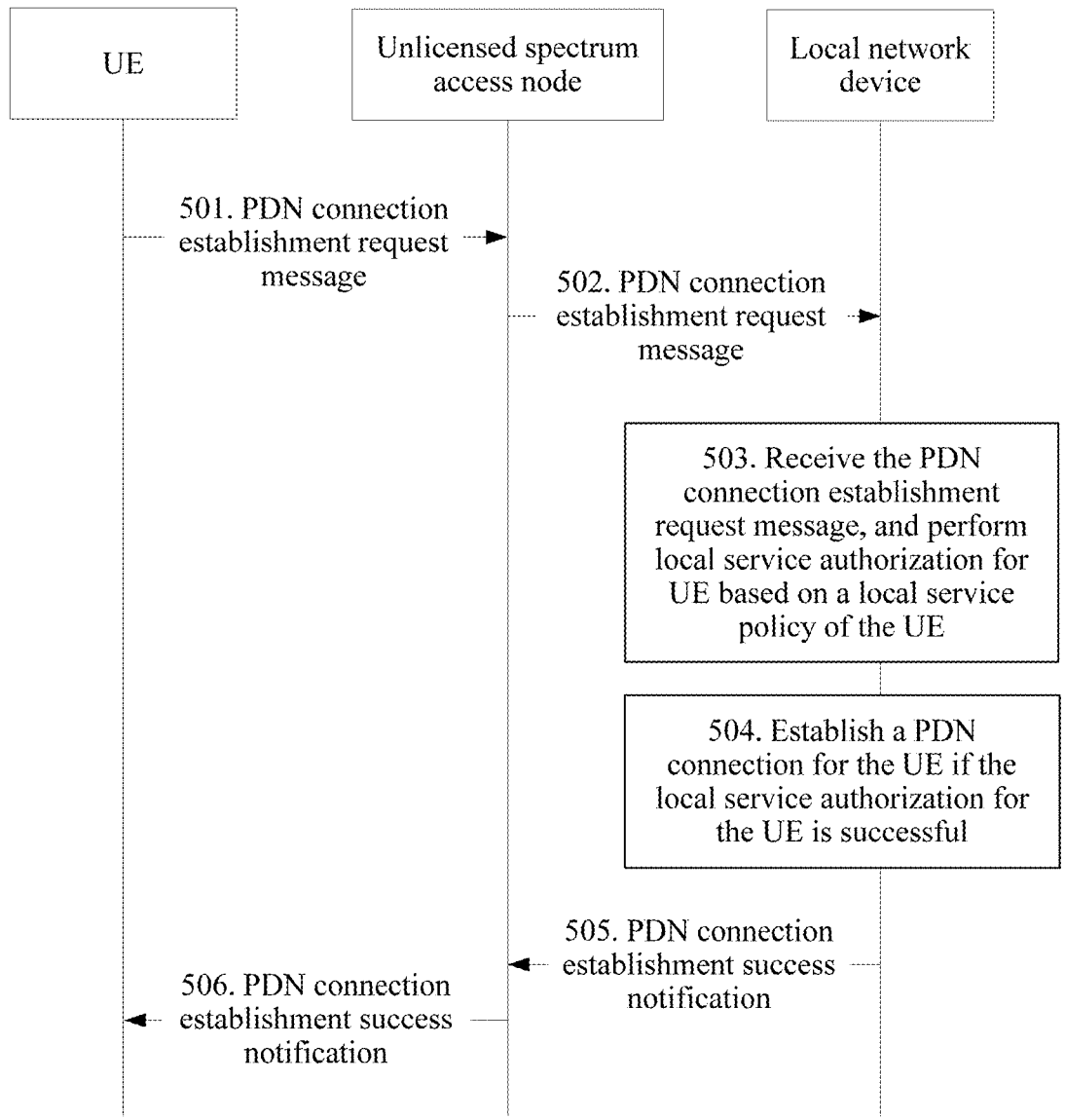
FIG. 5 is a schematic flowchart of a local service authorization method according to an embodiment of the present invention.

Based on the system architecture shown in FIG. 1, an embodiment of the present invention discloses a local service authorization method. FIG. 5 is a schematic flowchart of a local service authorization method according to an embodiment of the present invention. The local service authorization method shown in FIG. 5 is performed on a basis of the network access authorization methods shown in FIG. 2, FIG. 3A and FIG. 3B, and FIG. 4A and FIG. 4B. As shown in FIG. 5, the local service authorization method may include the following steps:

501. UE sends a local service connection establishment request message to an unlicensed spectrum access node.

In this embodiment of the present invention, after a control plane network element and an HSS of a home network successfully perform authorization for the UE that accesses the home network from the unlicensed spectrum access node, the UE receives an authorization result indicating authorization success. When the UE needs to perform a local service, the UE may initiate the local service to an LTE-U access node, that is, send the local service connection establishment request message to the unlicensed spectrum access node, where the local service connection establishment request message is used to request a local network device to establish a local service connection for the UE.

502. The unlicensed spectrum access node receives the local service connection establishment request message and forwards the local service connection establishment request message to a local network device.

503. The local network device receives the local service connection establishment request message, and performs local service authorization for the UE based on a local service policy of the UE.

In this embodiment of the present invention, the local service connection establishment request message may be specifically a PDN connection establishment request message, and the request message may include a type of the local service of the UE or an APN identifier of the local service. After receiving the local service connection establishment request message, the local network device performs local service authorization for the UE based on the local service policy of the UE.

In this embodiment of the present invention, a specific manner in which the local network device performs local service authorization for the UE based on the local service policy of the UE may be:

if the local service connection establishment request message includes the type of the local service requested by the UE, determining whether a service type in the local service policy of the UE includes the type of the local service requested by the UE, and if the service type in the local service policy of the UE includes the type of the local service requested by the UE, determining that local service authorization for the UE is successful; or if the local service connection establishment request message includes the APN identifier of the local service requested by the UE, determining whether a service APN identifier in the local service policy of the UE includes the APN identifier of the local service requested by the UE, and if the service APN identifier in the local service policy of the UE includes the APN identifier of the local service requested by the UE, determining that local service authorization for the UE is successful.

Specifically, if the type of the local service requested by the UE matches the service type in the local service policy, service authorization is successful; or if the APN identifier of the local service requested by the UE matches the service APN identifier in the local service policy, authorization is successful. Alternatively, when the local service (the type of the local service or the APN identifier of the local service) requested by the UE does not match the local service in the local service policy, or the UE does not carry any service indication, the local network device sends a PDN connection establishment request message (or may forward the PDN connection establishment request message sent by the UE) to the control plane network element, and the control plane network element establishes a PDN connection in an EPC based on an existing procedure.

504. The local network device establishes a local service connection for the UE if the local service authorization for the UE is successful.

In this embodiment of the present invention, if the local service authorization is successful, the local network device establishes a connection for the service, provides QoS guarantee based on a related QoS parameter in the local service policy, and completes charging. In addition, a subscriber category indication sent by the home network of the UE may also be used to perform service scheduling control, for example, preferentially guaranteeing a user service of a high class when congestion occurs. The foregoing service connection establishment manner is the same as that in the prior art. To be specific, the local network device selects a serving gateway of a local network, and sends a local service connection establishment request message (PDN connection establishment request message) such as a create session request message to the serving gateway of the local network, and the serving gateway of the local network allocates a resource to the service and notifies the local network device.

505. The local network device sends a local service connection establishment success notification to the unlicensed spectrum access node.

506. The unlicensed spectrum access node forwards the local service connection establishment success notification to the UE.

Obviously, in the method described in FIG. 5, if the control plane network element and the HSS of the home network successfully perform authorization for the UE that accesses the home network from the LTE-U access node, the local network device performs local service authorization for the UE based on subscription data of the UE that is sent by the control plane network element, and therefore can implement local service authorization when the UE accesses the home network from the LTE-U access node. After local service authorization is successful, the local service of the UE may be performed in the local network. Therefore, some services of the home network can be shared, load of the home network can be reduced, and resource utilization can be improved.

Figure 6:
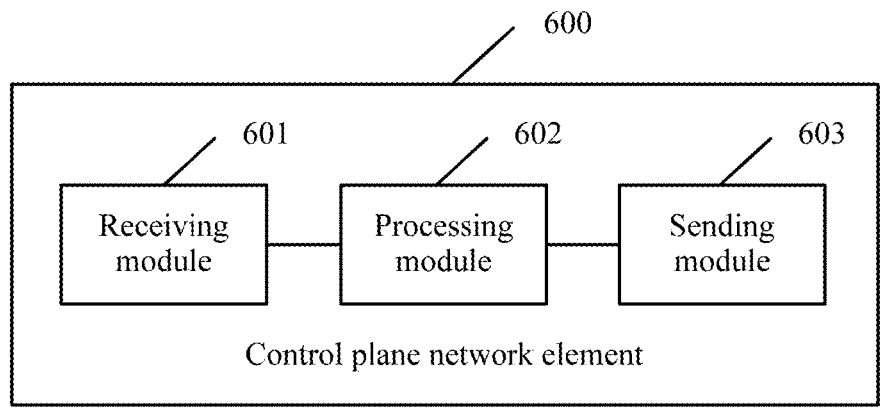
FIG. 6 is a schematic structural diagram of a control plane network element according to an embodiment of the present invention.

Based on the system architecture shown in FIG. 1, an embodiment of the present invention discloses a control plane network element. FIG. 6 is a schematic structural diagram of a control plane network element according to an embodiment of the present invention. The control plane network element 600 described in FIG. 6 may be applied to the foregoing method embodiment. As shown in FIG. 6, the control plane network element 600 may include a receiving module 601, a processing module 602, and a sending module 603.

The receiving module 601 is configured to receive a first message sent by a local network device, where the first message includes a request message and access information of UE, and the request message is used to request that the UE should access a home network of the UE from an unlicensed spectrum access node.

The processing module 602 is configured to perform, based on the request message, the access information, and subscription data of the UE, access authorization for the UE that accesses the home network from the unlicensed spectrum access node.

The sending module 603 is configured to send an authorization indication to the UE, where the authorization indication includes an authorization result of the access authorization.

Specifically, the sending module 603 sends the authorization indication to the local network device, and the local network device sends the authorization result to the UE by using an LTE-U access node.

In a feasible implementation, the subscription data may include second indication information about an access technology allowed to be used by the UE for accessing the home network, the access information may include first indication information, and the first indication information is used to indicate that an access technology used by the UE for accessing the home network is access from the unlicensed spectrum access node; and a specific manner in which the processing module 602 performs, based on the request message, the access information, and the subscription data of the UE, access authorization for the UE that accesses the home network from the unlicensed spectrum access node may be:

determining, based on the request message, whether the second indication information includes the first indication information; and if the second indication information includes the first indication information, determining to allow the UE to access the home network from the unlicensed spectrum access node, that is, access authorization for the UE is successful; or if the second indication information does not include the first indication information, determining to reject access by the UE to the home network from the unlicensed spectrum access node, that is, access authorization for the UE fails.

In another feasible implementation, the subscription data may further include a first access mode of the unlicensed spectrum access node when the UE is allowed to access the home network from the unlicensed spectrum access node. If the access information further includes a second access mode of the unlicensed spectrum access node when the UE requests to access the home network from the unlicensed spectrum access node, if the second indication information includes the first indication information, the processing module 602 further determines whether the first access mode matches the second access mode. The processing module 602 can determine to allow the UE to access the home network from the unlicensed spectrum access node only if the first access mode matches the second access mode.

Alternatively, if the second indication information includes the first indication information, but the first access mode does not match the second access mode, the processing module 602 determines to reject access by the UE to the home network from the unlicensed spectrum access node.

In still another feasible implementation, the subscription data may further include a domain identifier list, and the domain identifier list includes at least one of a service provider identifier and a roaming union identifier of a local network in which the UE is allowed to access the home network from the unlicensed spectrum access node. If the access information further includes an identifier of a local network in which the UE requests to access the home network from the unlicensed spectrum access node, if the second indication information includes the first indication information, the processing module 602 further determines whether the identifier of the local network exists in the domain identifier list. The processing module 602 determines to allow the UE to access the home network from the unlicensed spectrum access node only if the identifier of the local network exists, where the identifier of the local network includes at least one of a service provider identifier and a roaming union identifier of the local network.

Alternatively, if the second indication information includes the first indication information, but the identifier of the local network does not exist in the domain identifier list, the processing module 602 determines to reject access by the UE to the home network from the unlicensed spectrum access node.

Further, the subscription data may be further extended to include at least one of information about a time at which the UE is allowed to access the home network from the unlicensed spectrum access node, information about a location (for example, 3GPP location information) at which the UE is allowed to access the home network from the unlicensed spectrum access node, a security level of the unlicensed spectrum access node, and a security authentication mode of the local network. In this case, the access information sent by the local network device to the control plane network element may also further include at least one of information about a time at which the UE requests to access the home network from the unlicensed spectrum access node, information about a location at which the UE requests to access the home network from the unlicensed spectrum access node, a security level of the unlicensed spectrum access node, and a security authentication mode of the local network.

In still another feasible implementation, if the request message of the UE is an access request message, the sending module 603 is further configured to send a second message to an HSS, where the second message is used to obtain the subscription data of the UE; and the receiving module 601 is further configured to receive the subscription data of the UE that is sent by the HSS.

In this embodiment of the present invention, when the UE is initially attached, the UE sends the access request message to the control plane network element 600 by using the unlicensed spectrum access node, and the control plane network element 600 needs to obtain the subscription data of the UE from the HSS.

In still another feasible implementation, if the request message of the UE is a service request message, and the service request message includes a temporary identifier allocated by the home network to the UE, the processing module 602 is further configured to: determine, based on the temporary identifier, whether the control plane network element 600 is a control plane network element to which the UE is attached; if the control plane network element 600 is the control plane network element to which the UE is attached, determine whether the UE is in an idle state; and if the UE is in the idle state, perform the operation of performing, based on the request message, the access information, and subscription data of the UE, access authorization for the UE that accesses the home network from the unlicensed spectrum access node.

In this embodiment of the present invention, when the UE is attached to the home network, the UE sends the service request message to the control plane network element 600 by using the unlicensed spectrum access node; the control plane network element 600 needs to determine whether the control plane network element 600 is the control plane network element to which the UE is initially attached, and determine whether the UE is in the idle state on a 3GPP side; and the control plane network element 600 performs access authorization for the UE based on the request message, the access information, and the subscription data only if the control plane network element 600 is the control plane network element to which the UE is initially attached and the UE is in the idle state on the 3GPP side.

In still another feasible implementation, if the authorization result of the access authorization is that the UE is allowed to access the home network from the unlicensed spectrum access node, the processing module 602 is further configured to obtain, from the subscription data of the UE, a type of a local service that the UE is allowed to use in a local network, and generate a local service policy of the UE based on the type of the local service; and the sending module 603 is further configured to send the local service policy of the UE to the local network device, so that the local network device performs, based on the local service policy of the UE, local service authorization for the local service subsequently initiated by the UE.

In this embodiment of the present invention, after the control plane network element 600 successfully performs authorization for the UE that accesses the home network from the unlicensed spectrum access node, the control plane network element 600 may generate the local service policy of the UE for the type of the local service that the UE is allowed to use in the local network, so that the local network device may perform local service authorization for the UE based on the local service policy when the UE initiates the local service, and this can improve efficiency of performing local service authorization for the UE.

Figure 7:
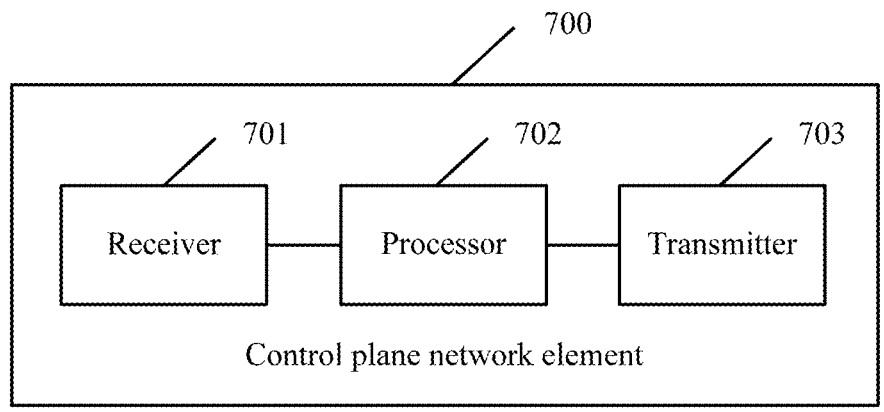
FIG. 7 is a schematic structural diagram of another control plane network element according to an embodiment of the present invention.

Based on the system architecture shown in FIG. 1, an embodiment of the present invention discloses another control plane network element. FIG. 7 is a schematic structural diagram of another control plane network element according to an embodiment of the present invention. The control plane network element 700 described in FIG. 7 may be applied to the foregoing method embodiment. As shown in FIG. 7, the control plane network element 700 may include a receiver 701, a processor 702, and a transmitter 703.

The receiver 701 is configured to receive a first message sent by a local network device, where the first message includes a request message and access information of UE, and the request message is used to request that the UE should access a home network of the UE from an unlicensed spectrum access node.

The processor 702 is configured to perform, based on subscription data of the UE, access authorization for the UE that accesses the home network from the unlicensed spectrum access node.

The transmitter 703 is configured to send an authorization indication to the UE, where the authorization indication includes an authorization result of the access authorization.

Specifically, the transmitter 703 sends the authorization indication to the local network device, and the local network device sends the authorization result to the UE by using an LTE-U access node.

In a feasible implementation, the subscription data may include second indication information about an access technology allowed to be used by the UE for accessing the home network, the access information may include first indication information, and the first indication information is used to indicate that an access technology used by the UE for accessing the home network is access from the unlicensed spectrum access node; and a specific manner in which the processor 702 performs, based on the request message, the access information, and the subscription data of the UE, access authorization for the UE that accesses the home network from the unlicensed spectrum access node may be:

determining, based on the request message, whether the second indication information includes the first indication information; and if the second indication information includes the first indication information, determining to allow the UE to access the home network from the unlicensed spectrum access node, that is, access authorization for the UE is successful; or if the second indication information does not include the first indication information, determining to reject access by the UE to the home network from the unlicensed spectrum access node, that is, access authorization for the UE fails.

In another feasible implementation, the subscription data may further include a first access mode of the unlicensed spectrum access node when the UE is allowed to access the home network from the unlicensed spectrum access node. If the access information further includes a second access mode of the unlicensed spectrum access node when the UE requests to access the home network from the unlicensed spectrum access node, if the second indication information includes the first indication information, the processor 702 further determines whether the first access mode matches the second access mode. The processor 702 can determine to allow the UE to access the home network from the unlicensed spectrum access node only if the first access mode matches the second access mode.

Alternatively, if the second indication information includes the first indication information, but the first access mode does not match the second access mode, the processor 702 determines to reject access by the UE to the home network from the unlicensed spectrum access node.

In still another feasible implementation, the subscription data may further include a domain identifier list, and the domain identifier list includes at least one of a service provider identifier and a roaming union identifier of a local network in which the UE is allowed to access the home network from the unlicensed spectrum access node. If the access information further includes an identifier of a local network in which the UE requests to access the home network from the unlicensed spectrum access node, if the second indication information includes the first indication information, the processor 702 further determines whether the identifier of the local network exists in the domain identifier list. The processor 702 determines to allow the UE to access the home network from the unlicensed spectrum access node only if the identifier of the local network exists, where the identifier of the local network includes at least one of a service provider identifier and a roaming union identifier of the local network.

Alternatively, if the second indication information includes the first indication information, but the identifier of the local network does not exist in the domain identifier list, the processor 702 determines to reject access by the UE to the home network from the unlicensed spectrum access node.

Further, the subscription data may be further extended to include at least one of information about a time at which the UE is allowed to access the home network from the unlicensed spectrum access node, information about a location (for example, 3GPP location information) at which the UE is allowed to access the home network from the unlicensed spectrum access node, a security level of the unlicensed spectrum access node, and a security authentication mode of the local network. In this case, the access information sent by the local network device to the control plane network element may also further include at least one of information about a time at which the UE requests to access the home network from the unlicensed spectrum access node, information about a location at which the UE requests to access the home network from the unlicensed spectrum access node, a security level of the unlicensed spectrum access node, and a security authentication mode of the local network.

In still another feasible implementation, if the request message of the UE is an access request message, the transmitter 703 is further configured to send a second message to an HSS, where the second message is used to obtain the subscription data of the UE; and the receiver 701 is further configured to receive the subscription data of the UE that is sent by the HSS.

In this embodiment of the present invention, when the UE is initially attached, the UE sends the access request message to the control plane network element 700 by using the unlicensed spectrum access node, and the control plane network element 700 needs to obtain the subscription data of the UE from the HSS.

In still another feasible implementation, if the request message of the UE is a service request message, and the service request message includes a temporary identifier allocated by the home network to the UE, the processor 702 is further configured to: determine, based on the temporary identifier, whether the control plane network element 700 is a control plane network element to which the UE is attached; if the control plane network element 700 is the control plane network element to which the UE is attached, determine whether the UE is in an idle state; and if the UE is in the idle state, perform the operation of performing, based on the request message, the access information, and subscription data of the UE, access authorization for the UE that accesses the home network from the unlicensed spectrum access node.

In this embodiment of the present invention, when the UE is attached to the home network, the UE sends the service request message to the control plane network element 700 by using the unlicensed spectrum access node; the control plane network element 700 needs to determine whether the control plane network element 700 is the control plane network element to which the UE is initially attached, and determine whether the UE is in the idle state on a 3GPP side; and the control plane network element 700 performs access authorization for the UE based on the subscription data only if the control plane network element 700 is the control plane network element to which the UE is initially attached and the UE is in the idle state on the 3GPP side.

In still another feasible implementation, if the authorization result of the access authorization is that the UE is allowed to access the home network from the unlicensed spectrum access node, the processor 702 is further configured to obtain, from the subscription data of the UE, a type of a local service that the UE is allowed to use in a local network, and generate a local service policy of the UE based on the type of the local service; and the transmitter 703 is further configured to send the local service policy of the UE to the local network device, so that the local network device performs, based on the local service policy of the UE, local service authorization for the local service subsequently initiated by the UE.

In this embodiment of the present invention, after the control plane network element 700 successfully performs authorization for the UE that accesses the home network from the unlicensed spectrum access node, the control plane network element 700 may generate the local service policy of the UE for the type of the local service that the UE is allowed to use in the local network, so that the local network device may perform local service authorization for the UE based on the local service policy when the UE initiates the local service, and this can improve efficiency of performing local service authorization for the UE.

Obviously, in the control plane network element described in FIG. 6 and FIG. 7, after receiving the request message of the UE for accessing the home network from the unlicensed spectrum access node, the control plane network element may perform, based on the subscription data of the UE, the access technology used by the UE, the access mode of the unlicensed spectrum access node, the identifier of the local network, the time information, the location information, or the like, access authorization for the UE that accesses the home network from the unlicensed spectrum access node, and therefore can implement access authorization for the UE that accesses an unlicensed spectrum network. Further, after the access authorization is successful, the local network may share some services of the home network. Therefore, load of the home network can be reduced, and resource utilization can be improved.

Figure 8:
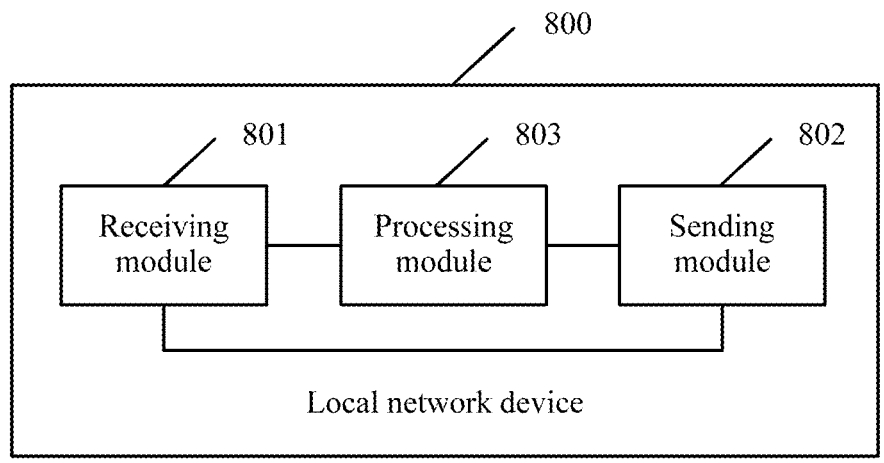
FIG. 8 is a schematic structural diagram of a local network device according to an embodiment of the present invention.

Based on the system architecture shown in FIG. 1, an embodiment of the present invention discloses a local network device. FIG. 8 is a schematic structural diagram of a local network device according to an embodiment of the present invention. The local network device 800 described in FIG. 8 may be applied to the foregoing method embodiment. As shown in FIG. 8, the local network device 800 may include a receiving module 801, a sending module 802, and a processing module 803.

The receiving module 801 is configured to receive a request message of UE that is sent by an unlicensed spectrum access node, where the request message is used to request that the UE should access a home network of the UE from the unlicensed spectrum access node.

The sending module 802 is configured to send a first message to a control plane network element, where the first message includes the request message and access information.

The receiving module 801 is further configured to receive an authorization indication sent by the control plane network element, where the authorization indication is obtained by the control plane network element by performing access authorization based on the request message, the access information, and subscription data of the UE, for the UE that accesses the home network from the unlicensed spectrum access node, and the authorization indication includes an authorization result of the access authorization.

The sending module 802 is further configured to send the authorization result to the UE.

Specifically, the local network device sends the authorization result to the unlicensed spectrum access node, and the unlicensed spectrum access node forwards the authorization result to the UE.

In a feasible implementation, if the request message includes an identifier of the home network, the processing module 803 is configured to generate routing information based on the identifier of the home network.

In this case, a specific manner in which the sending module 802 sends the first message to the control plane network element may be understood as:

sending the first message to the control plane network element based on the routing information.

The routing information may be an NAI, where the NAI further includes domain identifier information of an intermediate node, for example, a VPLMN, and a domain name such as an FQDN, in addition to information about an HPLMA of a destination domain at which the request message finally arrives. The sending module 802 may send the request message of the UE to the control plane network element of the home network based on the domain identifier information of the intermediate node and destination domain information in the routing information. Therefore, efficiency of information transmission is improved.

In another feasible implementation, if the authorization result of the access authorization is that the UE is allowed to access the home network from the unlicensed spectrum access node, the authorization indication may further include a local service policy of the UE;

the receiving module 801 is further configured to receive a second message sent by the unlicensed spectrum access node, where the second message is used to request to establish a local service connection for the UE; and the processing module 803 is further configured to perform local service authorization for the UE based on the local service policy of the UE, and establish the local service connection for the UE if the local service authorization for the UE is successful.

If the access authorization performed for the UE that accesses the home network from the unlicensed spectrum access node is successful, if the UE initiates a local service, the local network device 800 may perform local service authorization for the UE based on the local service policy of the UE, and this can improve efficiency of performing local service authorization for the UE that accesses an unlicensed spectrum network.

In still another feasible implementation, a specific manner in which the processing module 803 performs local service authorization for the UE based on the local service policy of the UE may be:

if the second message includes a type of a local service requested by the UE, determining whether a service type in the local service policy of the UE includes the type of the local service requested by the UE, and if the service type in the local service policy of the UE includes the type of the local service requested by the UE, determining that local service authorization for the UE is successful; or if the service type in the local service policy of the UE does not include the type of the local service requested by the UE, determining that local service authorization for the UE fails; or if the second message includes an APN identifier of a local service requested by the UE, determining whether a service APN identifier in the local service policy of the UE includes the APN identifier of the local service, and if the service APN identifier in the local service policy of the UE includes the APN identifier of the local service, determining that local service authorization for the UE is successful; or if the service APN identifier in the local service policy of the UE does not include the APN identifier of the local service, determining that local service authorization for the UE fails.

Figure 9:
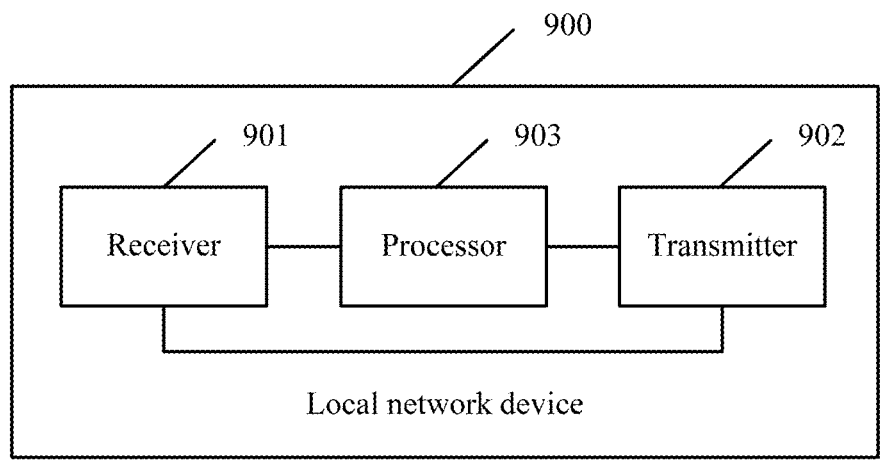
FIG. 9 is a schematic structural diagram of another local network device according to an embodiment of the present invention.

Based on the system architecture shown in FIG. 1, an embodiment of the present invention discloses another local network device. FIG. 9 is a schematic structural diagram of another local network device according to an embodiment of the present invention. The local network device 900 described in FIG. 9 may be applied to the foregoing method embodiment. As shown in FIG. 9, the local network device 900 may include a receiver 901, a transmitter 902, and a processor 903.

The receiver 901 is configured to receive a request message of UE that is sent by an unlicensed spectrum access node, where the request message is used to request that the UE should access a home network of the UE from the unlicensed spectrum access node.

The transmitter 902 is configured to send a first message to a control plane network element, where the first message includes the request message and access information.

The receiver 901 is further configured to receive an authorization indication sent by the control plane network element, where the authorization indication is obtained by the control plane network element by performing access authorization based on the request message, the access information, and subscription data of the UE, for the UE that accesses the home network from the unlicensed spectrum access node, and the authorization indication includes an authorization result of the access authorization.

The transmitter 902 is further configured to send the authorization result to the UE.

In a feasible implementation, if the request message includes an identifier of the home network, the processor 903 is configured to generate routing information based on the identifier of the home network.

In this case, a specific manner in which the transmitter 902 sends the first message to the control plane network element may be understood as:

sending the first message to the control plane network element based on the routing information.

In another feasible implementation, if the authorization result of the access authorization is that the UE is allowed to access the home network from the unlicensed spectrum access node, the authorization indication may further include a local service policy of the UE;

the receiver 901 is further configured to receive a second message sent by the unlicensed spectrum access node, where the second message is used to request to establish a local service connection for the UE; and the processor 903 is further configured to perform local service authorization for the UE based on the local service policy of the UE, and establish the local service connection for the UE if the local service authorization for the UE is successful.

If the access authorization performed for the UE that accesses the home network from the unlicensed spectrum access node is successful, if the UE initiates a local service, the local network device 900 may perform local service authorization for the UE based on the local service policy of the UE, and this can improve efficiency of performing local service authorization for the UE that accesses an unlicensed spectrum network.

In still another feasible implementation, a specific manner in which the processor 903 performs local service authorization for the UE based on the local service policy of the UE may be:

if the second message includes a type of a local service requested by the UE, determining whether a service type in the local service policy of the UE includes the type of the local service requested by the UE, and if the service type in the local service policy of the UE includes the type of the local service requested by the UE, determining that local service authorization for the UE is successful; or if the service type in the local service policy of the UE does not include the type of the local service requested by the UE, determining that local service authorization for the UE fails; or if the second message includes an APN identifier of a local service requested by the UE, determining whether a service APN identifier in the local service policy of the UE includes the APN identifier of the local service, and if the service APN identifier in the local service policy of the UE includes the APN identifier of the local service, determining that local service authorization for the UE is successful; or if the service APN identifier in the local service policy of the UE does not include the APN identifier of the local service, determining that local service authorization for the UE fails.

Obviously, in the local network device described in FIG. 8 and FIG. 9, when receiving the request message of the UE for accessing the home network from the unlicensed spectrum access node, the local network device forwards the request message to the control plane network element of the home network. If the control plane network element successfully performs access authorization for the UE, if the UE initiates the local service, the local network device may perform local service authorization for the UE based on the local service policy of the UE, and therefore can implement local service authorization when the UE accesses an unlicensed spectrum network. After local service authorization is successful, the local service of the UE may be performed in the local network. Therefore, some services of the home network can be shared, load of the home network can be reduced, and resource utilization can be improved.

Figure 10:
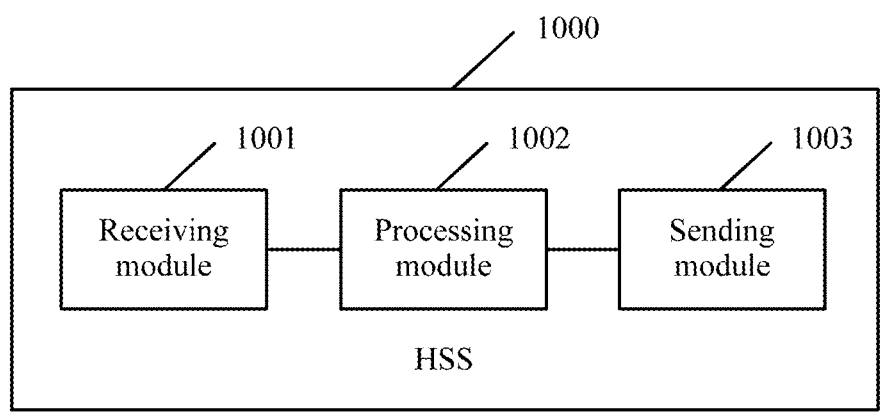
FIG. 10 is a schematic structural diagram of an HSS according to an embodiment of the present invention.

Based on the system architecture shown in FIG. 1, an embodiment of the present invention discloses an HSS. FIG. 10 is a schematic structural diagram of an HSS according to an embodiment of the present invention. The HSS 1000 described in FIG. 10 may be applied to the foregoing method embodiment. As shown in FIG. 10, the HSS 1000 may include a receiving module 1001, a processing module 1002, and a sending module 1003.

The receiving module 1001 is configured to receive a first message sent by a control plane network element, where the first message is used to obtain subscription data of UE, the first message includes an access request message and access information of the UE, and the access request message is used to request that the UE should access a home network from an unlicensed spectrum access node.

The processing module 1002 is configured to obtain the subscription data of the UE, and perform, based on the access request message, the access information, and the subscription data, access authorization for the UE that accesses the home network from the unlicensed spectrum access node.

The sending module 1003 is configured to send the subscription data to the control plane network element if allowing the UE to access the home network from the unlicensed spectrum access node, so that the control plane network element performs, based on the subscription data, access authorization again for the UE that accesses the home network from the unlicensed spectrum access node.

In a feasible implementation, the subscription data may include second indication information about an access technology allowed to be used by the UE for accessing the home network, and the access information may include first indication information used to indicate that an access technology used by the UE for accessing the home network is access from the unlicensed spectrum access node. In this case, a specific manner in which the processing module 1002 performs, based on the access request message, the access information, and the subscription data, access authorization for the UE that accesses the home network from the unlicensed spectrum access node may be:

determining, based on the access request message, whether the second indication information includes the first indication information; and if the second indication information includes the first indication information, determining to allow the UE to access the home network from the unlicensed spectrum access node; or if the second indication information does not include the first indication information, determining to reject access by the UE to the home network from the unlicensed spectrum access node.

In another feasible implementation, the subscription data may include a domain identifier list, and the domain identifier list includes at least one of a service provider identifier and a roaming union identifier of a local network in which the UE is allowed to access the home network from the unlicensed spectrum access node; and the access information further includes an identifier of a local network in which the UE requests to access the home network from the unlicensed spectrum access node, and the identifier of the local network includes at least one of a service provider identifier and a roaming union identifier of the local network. In this case, a specific manner in which the processing module 1002 performs, based on the access request message, the access information, and the subscription data, access authorization for the UE that accesses the home network from the unlicensed spectrum access node may be:

determining, based on the access request message, whether the identifier of the local network exists in the domain identifier list; and if the identifier of the local network exists, determining to allow the UE to access the home network from the unlicensed spectrum access node; or if the identifier of the local network does not exist, determining to reject access by the UE to the home network from the unlicensed spectrum access node.

Figure 11:
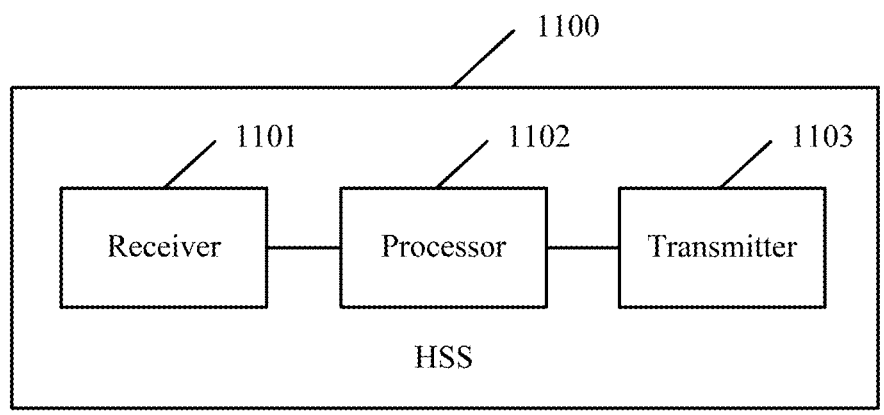
FIG. 11 is a schematic structural diagram of another HSS according to an embodiment of the present invention.

Based on the system architecture shown in FIG. 1, an embodiment of the present invention discloses another HSS. FIG. 11 is a schematic structural diagram of another HSS according to an embodiment of the present invention. The HSS 1100 described in FIG. 11 may be applied to the foregoing method embodiment. As shown in FIG. 11, the HSS 1100 may include a receiver 1101, a processor 1102, and a transmitter 1103.

The receiver 1101 is configured to receive a first message sent by a control plane network element, where the first message is used to obtain subscription data of UE, the first message includes an access request message and access information of the UE, and the access request message is used to request that the UE should access a home network from an unlicensed spectrum access node.

The processor 1102 is configured to obtain the subscription data of the UE, and perform, based on the access request message, the access information, and the subscription data, access authorization for the UE that accesses the home network from the unlicensed spectrum access node.

The transmitter 1103 is configured to send the subscription data to the control plane network element if allowing the UE to access the home network from the unlicensed spectrum access node, so that the control plane network element performs, based on the subscription data, access authorization again for the UE that accesses the home network from the unlicensed spectrum access node.

In a feasible implementation, the subscription data may include second indication information about an access technology allowed to be used by the UE for accessing the home network, and the access information may include first indication information used to indicate that an access technology used by the UE for accessing the home network is access from the unlicensed spectrum access node. In this case, a specific manner in which the processor 1102 performs, based on the access request message, the access information, and the subscription data, access authorization for the UE that accesses the home network from the unlicensed spectrum access node may be:

determining, based on the access request message, whether the second indication information includes the first indication information; and if the second indication information includes the first indication information, determining to allow the UE to access the home network from the unlicensed spectrum access node; or if the second indication information does not include the first indication information, determining to reject access by the UE to the home network from the unlicensed spectrum access node.

In another feasible implementation, the subscription data may include a domain identifier list, and the domain identifier list includes at least one of a service provider identifier and a roaming union identifier of a local network in which the UE is allowed to access the home network from the unlicensed spectrum access node; and the access information further includes an identifier of a local network in which the UE requests to access the home network from the unlicensed spectrum access node, and the identifier of the local network includes at least one of a service provider identifier and a roaming union identifier of the local network. In this case, a specific manner in which the processor 1102 performs, based on the access request message, the access information, and the subscription data, access authorization for the UE that accesses the home network from the unlicensed spectrum access node may be:

determining, based on the access request message, whether the identifier of the local network exists in the domain identifier list; and if the identifier of the local network exists, determining to allow the UE to access the home network from the unlicensed spectrum access node; or if the identifier of the local network does not exist, determining to reject access by the UE to the home network from the unlicensed spectrum access node.

Obviously, in the HSS described in FIG. 10 and FIG. 11, if the UE is initially attached to the home network by using the unlicensed spectrum access node, after the HSS receives the first message used to obtain the subscription data of the UE, the HSS may perform initial access authorization for the UE based on the access request message and the access information in the first message, and the subscription data of the UE. The subscription data of the UE is sent to the control plane network element only if authorization is successful, so that the control plane network element performs access authorization again for the UE based on the subscription data. The HSS and the control plane network element perform hierarchical access authorization for the UE that accesses the home network from the unlicensed spectrum access node. Therefore, accuracy of access authorization performed for the UE can be improved.

Figure 12:
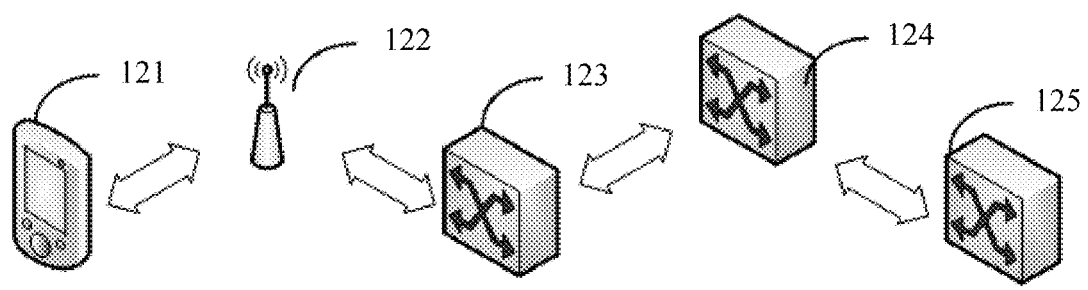
FIG. 12 is a schematic structural diagram of a network access authorization system according to an embodiment of the present invention.

Based on the system architecture shown in FIG. 1, an embodiment of the present invention discloses a network access authorization system. FIG. 12 is a schematic structural diagram of a network access authorization system according to an embodiment of the present invention. As shown in FIG. 12, the system may include UE 121, an unlicensed spectrum access node 122, a local network device 123, a control plane network element 124, and an HSS 125, and is configured to perform steps of the procedure in the network access authorization method disclosed in the foregoing method embodiment. The local network device 123 is the local network device described in FIG. 8 and FIG. 9, the control plane network element 124 is the control plane network element described in FIG. 6 and FIG. 7, and the HSS is the HSS described in FIG. 10 and FIG. 11.

After discovering the unlicensed spectrum access node 122, the UE 121 may send a request message to the unlicensed spectrum access node, requesting to access a home network, where the request message includes an identifier of the home network. The unlicensed spectrum access node 122 forwards the request message to the local network device 123, for example, an MME of a local network. The local network device 123 generates routing information based on the identifier of the home network and a network topology, and therefore routes the request message to the control plane network element 124 such as an MME or an AAA server in the home network based on the routing information.

If the request message is an access request message, that is, the UE 121 is initially attached to the home network, the control plane network element 124 obtains subscription data of the UE 121 from the HSS 125 based on the access request message. The HSS 125 performs access authorization for the UE 121 based on the subscription data and access information in the request message of the UE 121 for accessing the home network from the unlicensed spectrum access node 122, and sends the subscription data of the UE 121 to the control plane network element 124 only if authorization is successful, so that the control plane network element 124 performs access authorization again for the UE 121 based on the subscription data.

If the request message is a service request message, that is, the UE 121 is attached to the home network by using a licensed spectrum access node, and currently needs to send a service request to the home network by using the unlicensed spectrum access node 122, the control plane network element 124 performs access authorization for the UE 121 based on the subscription data and the access information of the UE 121 if determining that the control plane network element 124 is the control plane network element to which the UE 121 is attached and the UE 121 is in an idle state on a 3GPP side.

The subscription data of the UE 121 may be extended to include indication information about an access technology allowed to be used by the UE 121 for accessing the home network, an access mode of the unlicensed spectrum access node when the UE 121 is allowed to access the home network from the unlicensed spectrum access node, a service provider identifier or a roaming union identifier of the local network, or the like. The access information may include indication information about an access technology (access from the unlicensed spectrum access node 122) used by the UE 121 for requesting to access the home network, an access mode of the unlicensed spectrum access node 122 when the UE 121 requests to access the home network from the unlicensed spectrum access node, a service provider identifier or a roaming union identifier of the local network, or the like.

Further, if the control plane network element 124 successfully performs authorization for the UE 121 that accesses the home network from the unlicensed spectrum access node 122, if the UE 121 initiates a local service to the local network device 123, the local network device 123 performs local service authorization for the UE 121 based on a local service policy of the UE 121.

Obviously, in the network access authorization system described in FIG. 12, the network access authorization system may implement access authorization and local service authorization for the UE that accesses the home network from the unlicensed spectrum access node. After the access authorization is successful, the local network may share some services of the home network. Therefore, load of the home network can be reduced, and resource utilization can be improved.

It should be noted that, in the foregoing embodiments, the descriptions of the embodiments have respective focuses. For a part that is not described in detail in an embodiment, reference may be made to related descriptions in other embodiments. In addition, a person skilled in the art should also appreciate that all the embodiments described in the specification are embodiments as an example, and the related actions and modules are not necessarily mandatory to the present invention.

Steps in the methods in the embodiments of the present invention may be adjusted, combined, or deleted according to an actual requirement.

The modules in the control plane network element, the local network device, and the HSS in the embodiments of the present invention may be combined, divided, and deleted according to an actual requirement.

The control plane network element, the local network device, and the HSS in the embodiments of the present invention may be implemented by a universal integrated circuit, such as a CPU (Central Processing Unit, central processing unit) or an ASIC (Application-Specific Integrated Circuit, application-specific integrated circuit).

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include a magnetic disk, an optical disc, a read-only memory (Read-Only Memory, ROM), a random access memory (Random Access Memory, RAM), or the like.

The network access authorization method, the related device, and the system disclosed in the embodiments of the present invention are described in detail above. In this specification, specific examples are used to describe the principle and implementations of the present invention, and the description of the embodiments is only intended to help understand the method and core idea of the present invention. In addition, a person of ordinary skill in the art may, based on the idea of the present invention, make modifications with respect to the specific implementations and the application scope. Therefore, the content of this specification shall not be construed as a limitation to the present invention.

What is claimed is:

1. A method, comprising:

receiving, by a control plane network element of an evolved packet system (EPS), a first message sent by a local network device, wherein the EPS comprises an unlicensed spectrum access node and the control plane network element, wherein the first message comprises a request message and access information of a user equipment (UE), and wherein the request message requests that the UE should access a home network of the UE from the unlicensed spectrum access node;

after the receiving the first message, performing, by the control plane network element, access authorization for the UE is to access the home network from the unlicensed spectrum access node based on the request message and the access information in the first message, and subscription data of the UE, wherein the access information comprises first indication information, the first indication information indicates that an access technology used by the UE for accessing the home network is accessed from the unlicensed spectrum access node, wherein the subscription data comprises second indication information indicating an access technology allowed to be used by the UE for accessing the home network, wherein the subscription data further comprises a domain identifier list, and the domain identifier list comprises a service provider identifier or a roaming union identifier of a local network in which the UE is allowed to access the home network from the unlicensed spectrum access node, wherein the access information further comprises an identifier of a local network in which the UE requests to access the home network from the unlicensed spectrum access node, and the identifier of the local network comprises a service provider identifier or a roaming union identifier of the local network, and wherein the performing the access authorization further comprises:

determining, by the control plane network element, whether the identifier of the local network exists in the domain identifier list based on determination that the second indication information comprises the first indication information; and performing, by the control plane network element, the access authorization to allow the UE to access the home network from the unlicensed spectrum access node based on determination that the identifier of the local network exists in the domain identifier list; or determining, by the control plane network element, to reject access by the UE to the home network from the unlicensed spectrum access node based on determination that the identifier of the local network does not exist in the domain identifier list; and sending, by the control plane network element, an authorization indication to the UE, wherein the authorization indication comprises an authorization result of the access authorization.

2. The method according to claim 1, wherein the performing the access authorization comprises:

determining, by the control plane network element based on the request message, whether the second indication information comprises the first indication information; and determining, by the control plane network element, to allow the UE to access the home network from the unlicensed spectrum access node based on determination that the second indication information comprises the first indication information; or determining, by the control plane network element, to reject access by the UE to the home network from the unlicensed spectrum access node based on determination that the second indication information does not comprise the first indication information.

3. The method according to claim 1, wherein the request message is a service request message, the service request message comprises a temporary identifier of the UE, and the method further comprises:

after the receiving the first message:

determining, by the control plane network element based on the temporary identifier, that the control plane network element is a control plane network element to which the UE is attached; and determining, by the control plane network element, that the UE is in an idle state; and performing, by the control plane network element based on the request message, the access information, and the subscription data of the UE, the access authorization for the UE is to access the home network from the unlicensed spectrum access node.

4. The method according to claim 1, wherein the subscription data comprises a type of a local service that the UE is allowed to use in a local network, and the method further comprises:

after the performing the access information:

obtaining, by the control plane network element, the type of the local service from the subscription data, wherein the authorization result of the access authorization is that the UE is allowed to access the home network from the unlicensed spectrum access node;

generating, by the control plane network element, a local service policy of the UE based on the type of the local service; and sending, by the control plane network element, the local service policy to the local network device, so that the local network device performs, based on the local service policy, local service authorization for the local service initiated by the UE.

5. The method according to claim 1, wherein the request message in the first message is one of an attach request message, a connection request message, or a non-access stratum (NAS) message carrying a Diameter message, and wherein the access information in the first message includes at least one of feature information of a local network, feature information of the unlicensed spectrum access node, location information of the UE, and time information.

6. A control plane network element of an evolved packet system (EPS), the control plane network element comprising:

at least one processor; and a non-transitory computer readable storage medium storing programming, the programming including instructions for execution by the at least one processor to:

receive a first message sent by a local network device, wherein the EPS comprises an unlicensed spectrum access node and the control plane network element, wherein the first message comprises a request message and access information of a user equipment (UE), and wherein the request message requests that the UE should access a home network of the UE from the unlicensed spectrum access node;

after receiving the first message, perform, access authorization for the UE is to access the home network from the unlicensed spectrum access node based on the request message and the access information of the first message, and subscription data of the UE, wherein the access information comprises first indication information, the first indication information indicates that an access technology used by the UE for accessing the home network is accessed from the unlicensed spectrum access node, wherein the subscription data comprises second indication information indicating an access technology allowed to be used by the UE for accessing the home network, wherein the subscription data further comprises a domain identifier list, and the domain identifier list comprises a service provider identifier or a roaming union identifier of a local network in which the UE is allowed to access the home network from the unlicensed spectrum access node, wherein the access information further comprises an identifier of a local network in which the UE requests to access the home network from the unlicensed spectrum access node, and the identifier of the local network comprises a service provider identifier or a roaming union identifier of the local network, and wherein the instructions to perform the access authorization include instructions to:

determine whether the identifier of the local network exists in the domain identifier list based on determination that the second indication information comprises the first indication information; and perform the access authorization to allow the UE to access the home network from the unlicensed spectrum access node based on determination that the identifier of the local network exists in the domain identifier list; or determine to reject access by the UE to the home network from the unlicensed spectrum access node based on determination that the identifier of the local network does not exist in the domain identifier list; and send an authorization indication to the UE, wherein the authorization indication comprises an authorization result of the access authorization.

7. The control plane network element according to claim 6, wherein the instructions to perform the access authorization include instructions to:

determine, based on the request message, whether the second indication information comprises the first indication information; and determine to allow the UE to access the home network from the unlicensed spectrum access node based on determination that the second indication information comprises the first indication information; or determining to reject access by the UE to the home network from the unlicensed spectrum access node based on determination that the second indication information does not comprise the first indication information.

8. The control plane network element according to claim 6, wherein the subscription data further comprises at least one of: information about a time at which the UE is allowed to access the home network from the unlicensed spectrum access node, information about a location at which the UE is allowed to access the home network from the unlicensed spectrum access node, a security level of the unlicensed spectrum access node, or a security authentication mode of the local network; or wherein the access information further comprises at least one of: information about a time at which the UE requests to access the home network from the unlicensed spectrum access node, information about a location at which the UE requests to access the home network from the unlicensed spectrum access node, a security level of the unlicensed spectrum access node, or a security authentication mode of the local network.

9. The control plane network element according to claim 6, wherein the request message is a service request message, and wherein the service request message comprises a temporary identifier of the UE, the programming further including instructions to:

determine, based on the temporary identifier, that the control plane network element is a control plane network element to which the UE is attached;

determine that the UE is in an idle state; and perform, based on the request message, the access information, and the subscription data of the UE, the access authorization for the UE is to access the home network from the unlicensed spectrum access node.

10. The control plane network element according to claim 6, wherein the subscription data comprises a type of a local service that the UE is allowed to use in a local network, the programming further including instructions to:

obtain the type of the local service from the subscription data;

generate a local service policy of the UE based on the type of the local service; and send the local service policy to the local network device, so that the local network device performs, based on the local service policy, local service authorization for the local service initiated by the UE.

* * * * *